March 24, 1970 R. L. STEINER ET AL 3,502,383
TOWELING DISPENSER WITH LOOP CONTROL
Filed May 7, 1968 13 Sheets-Sheet 1

INVENTORS
ROBERT L. STEINER
ERWIN B. BAHNSEN
BY
Prangley, Baird, Clayton,
Miller & Vogel
ATTYS.

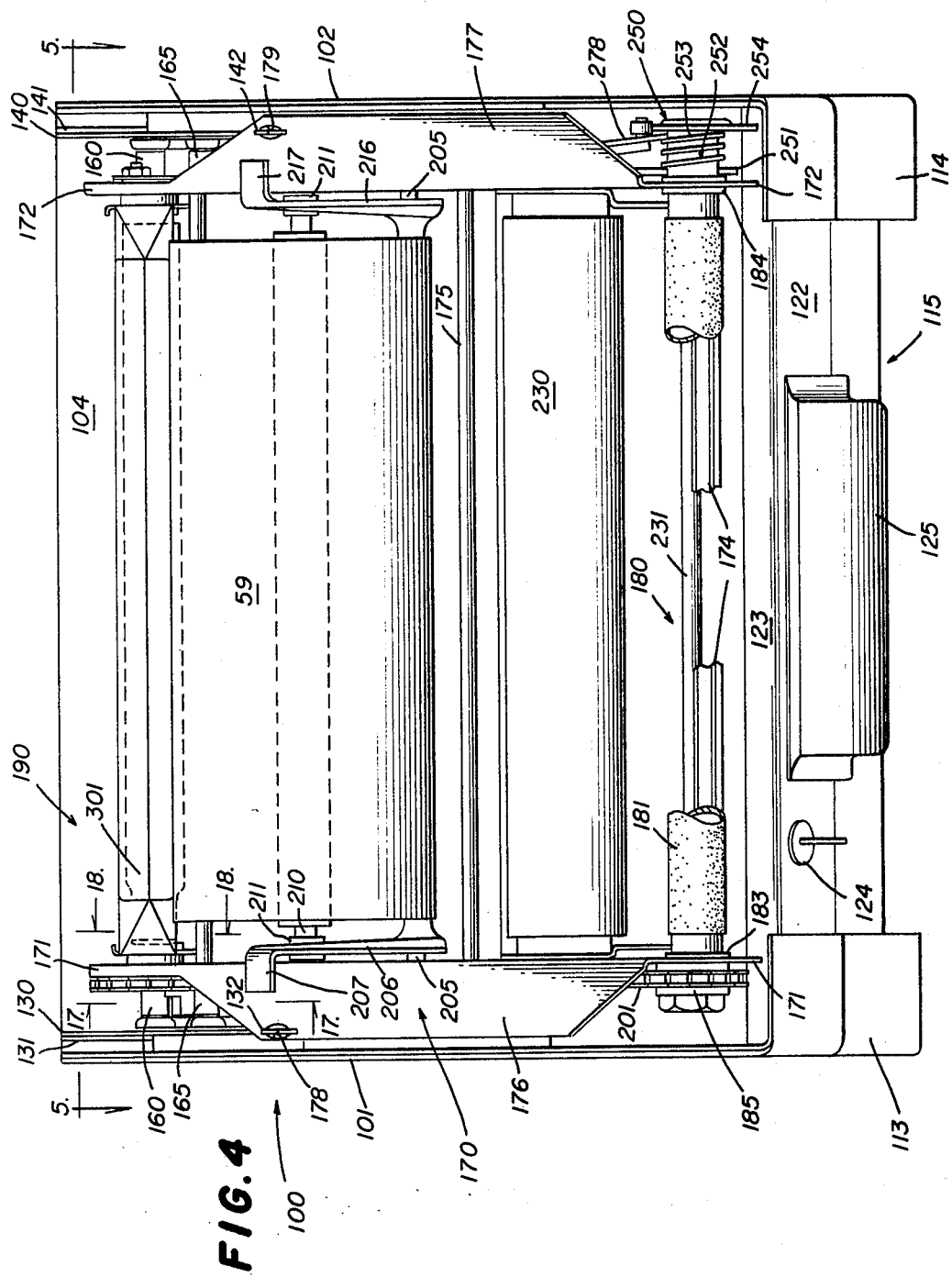

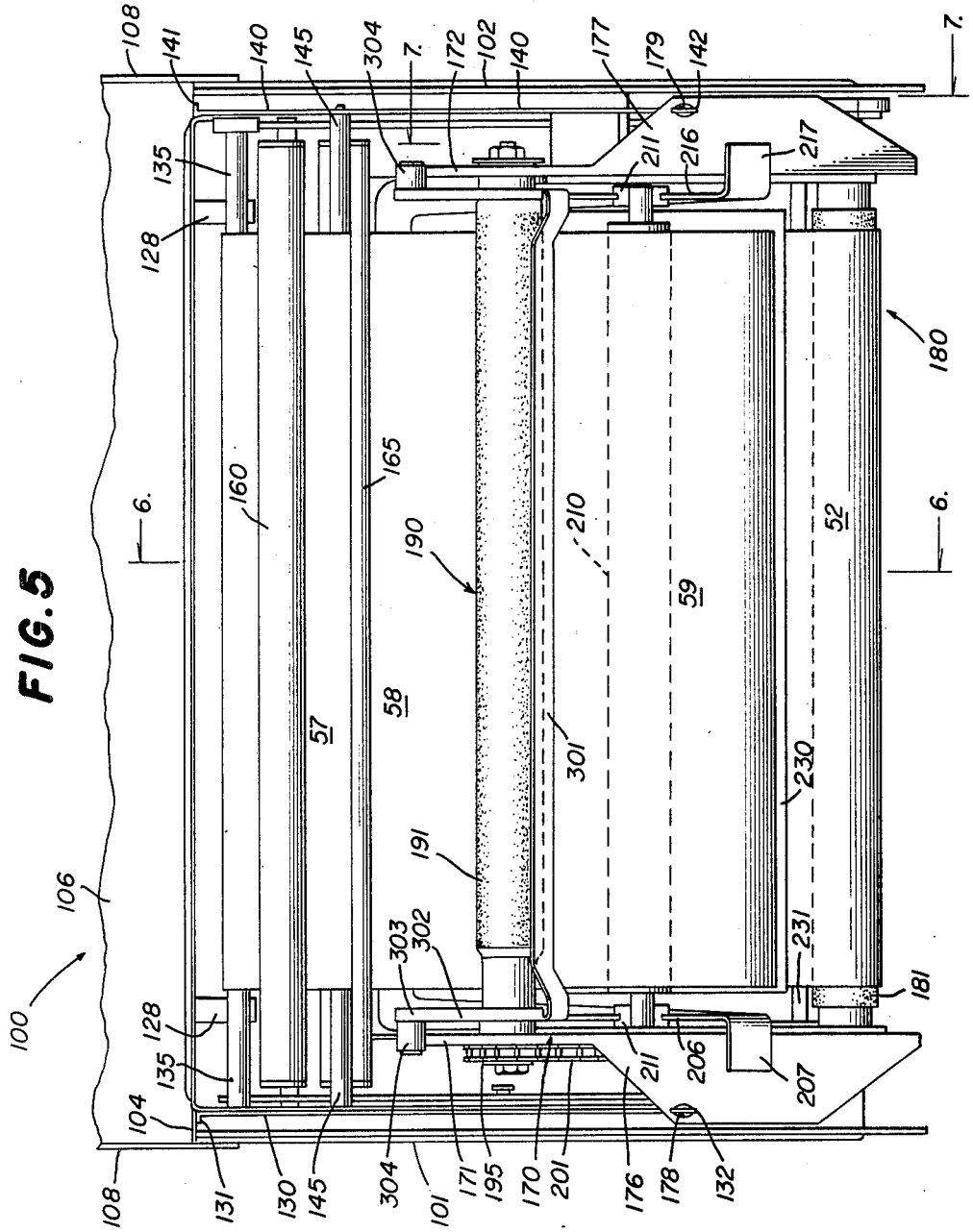

March 24, 1970 R. L. STEINER ET AL 3,502,383
TOWELING DISPENSER WITH LOOP CONTROL
Filed May 7, 1968 13 Sheets-Sheet 4

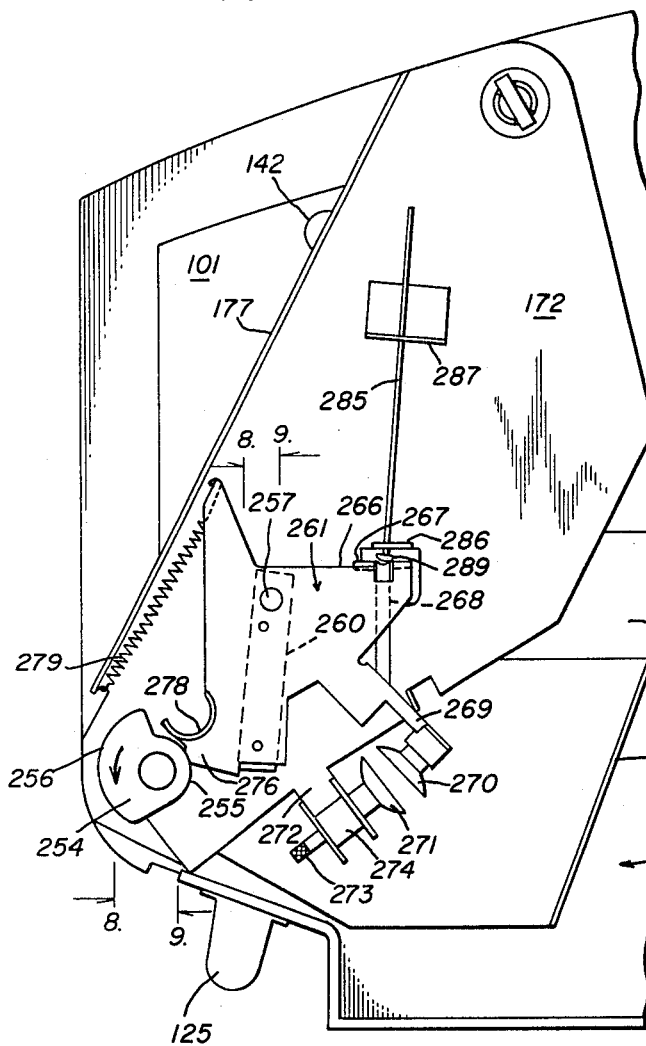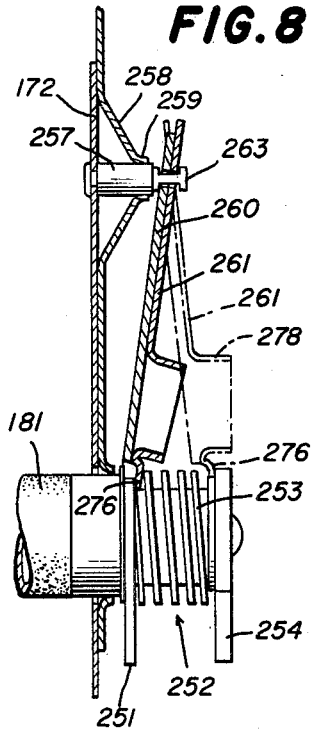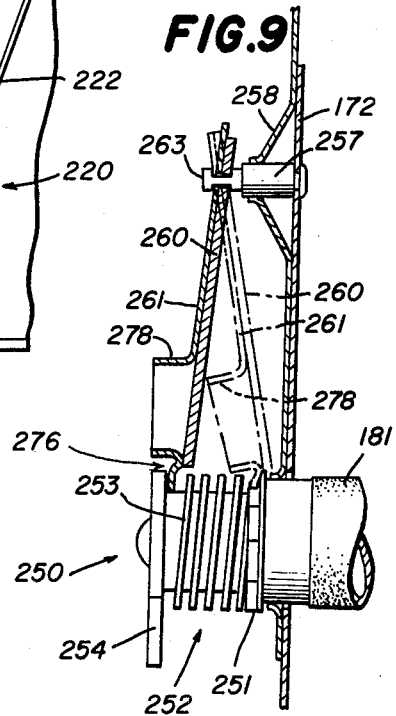

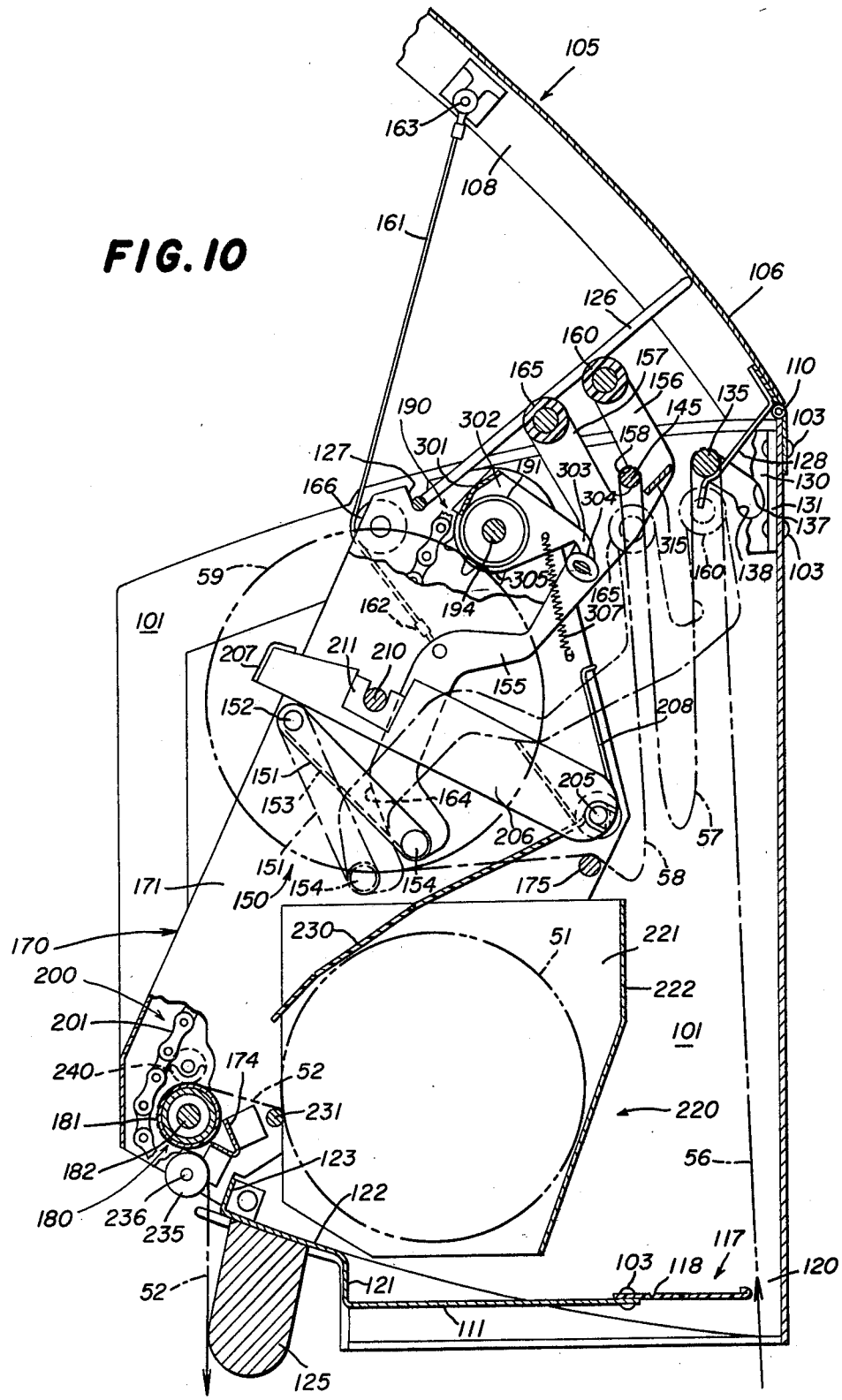

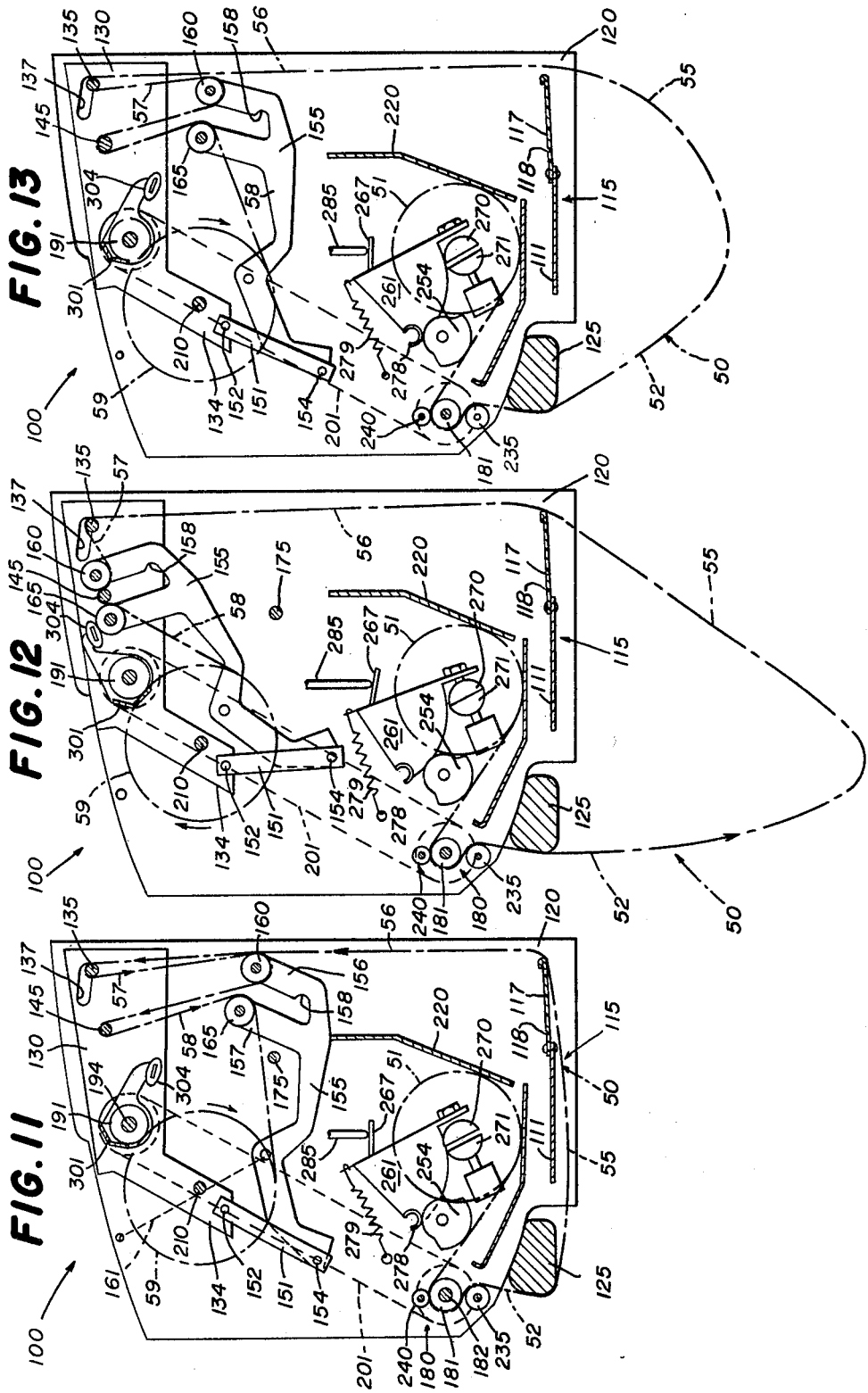

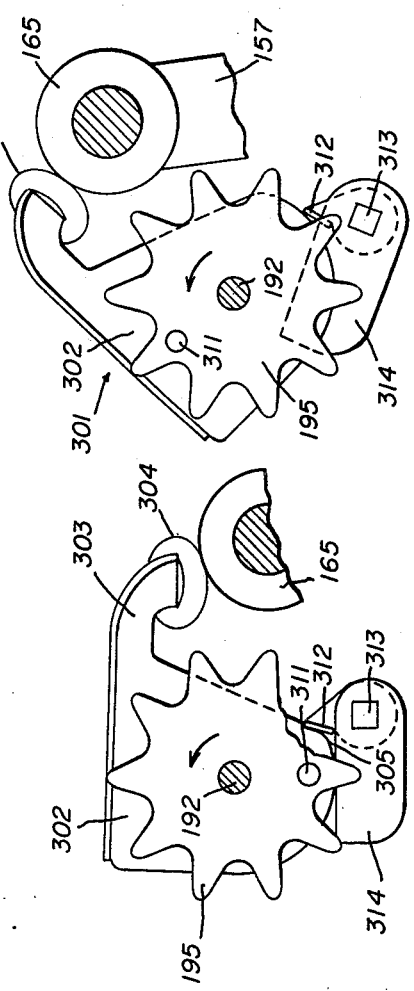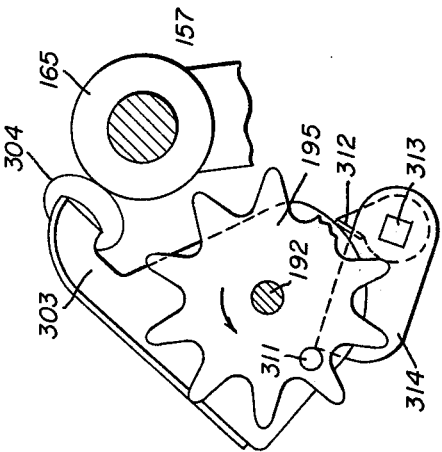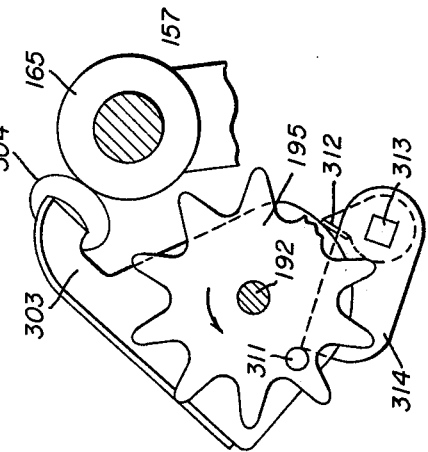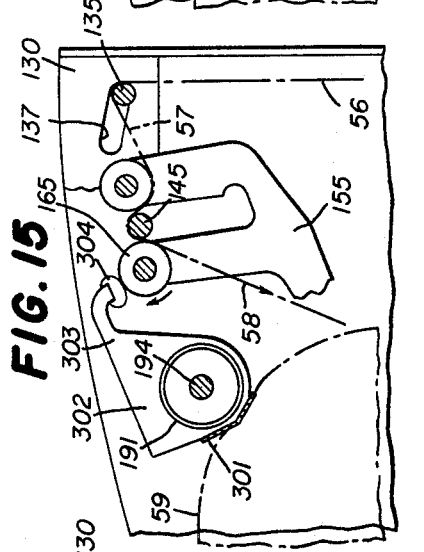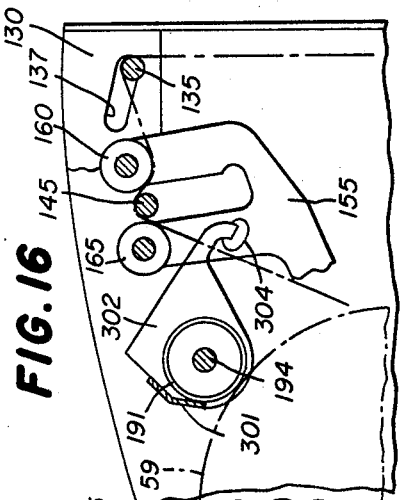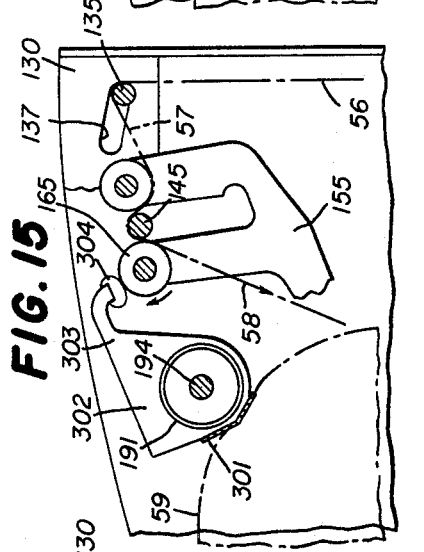

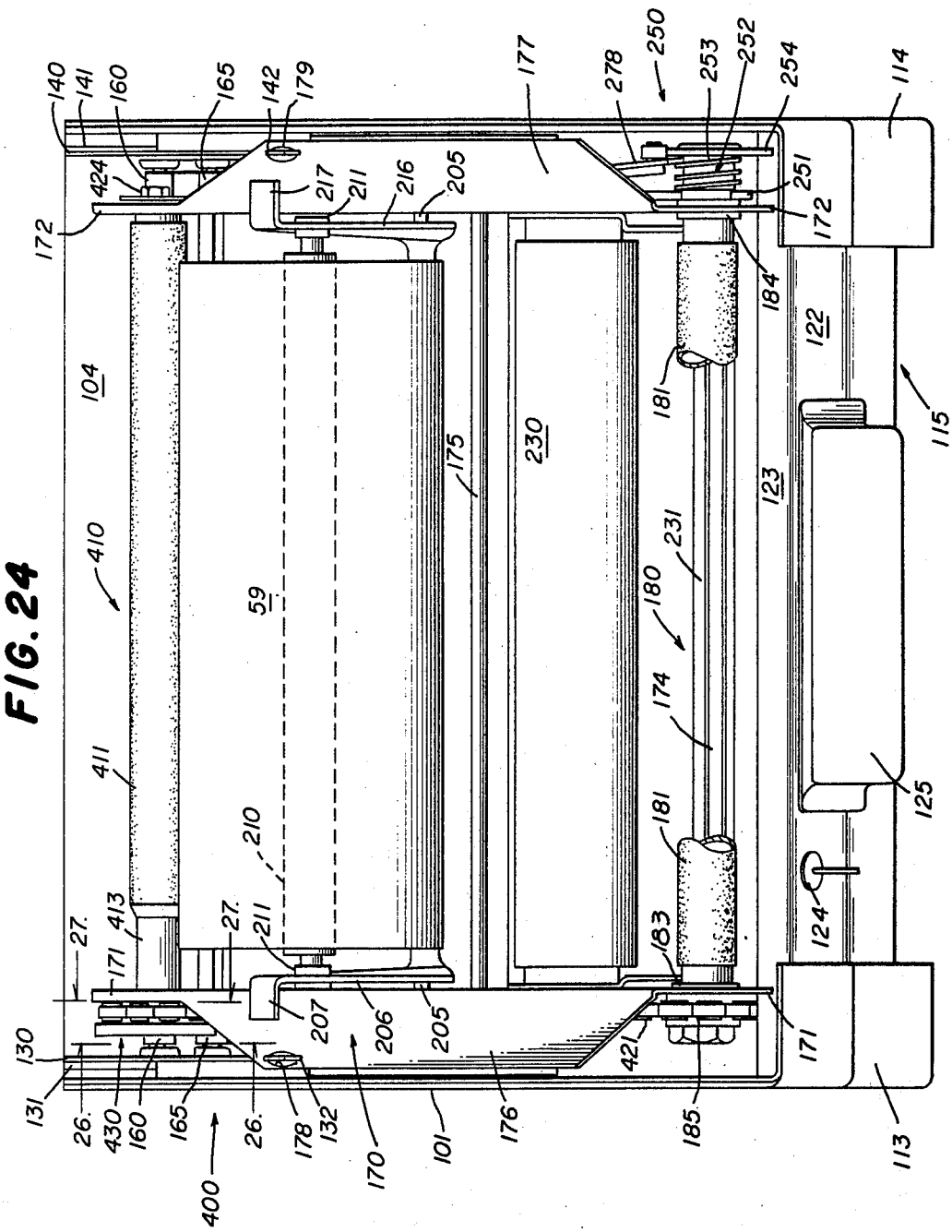

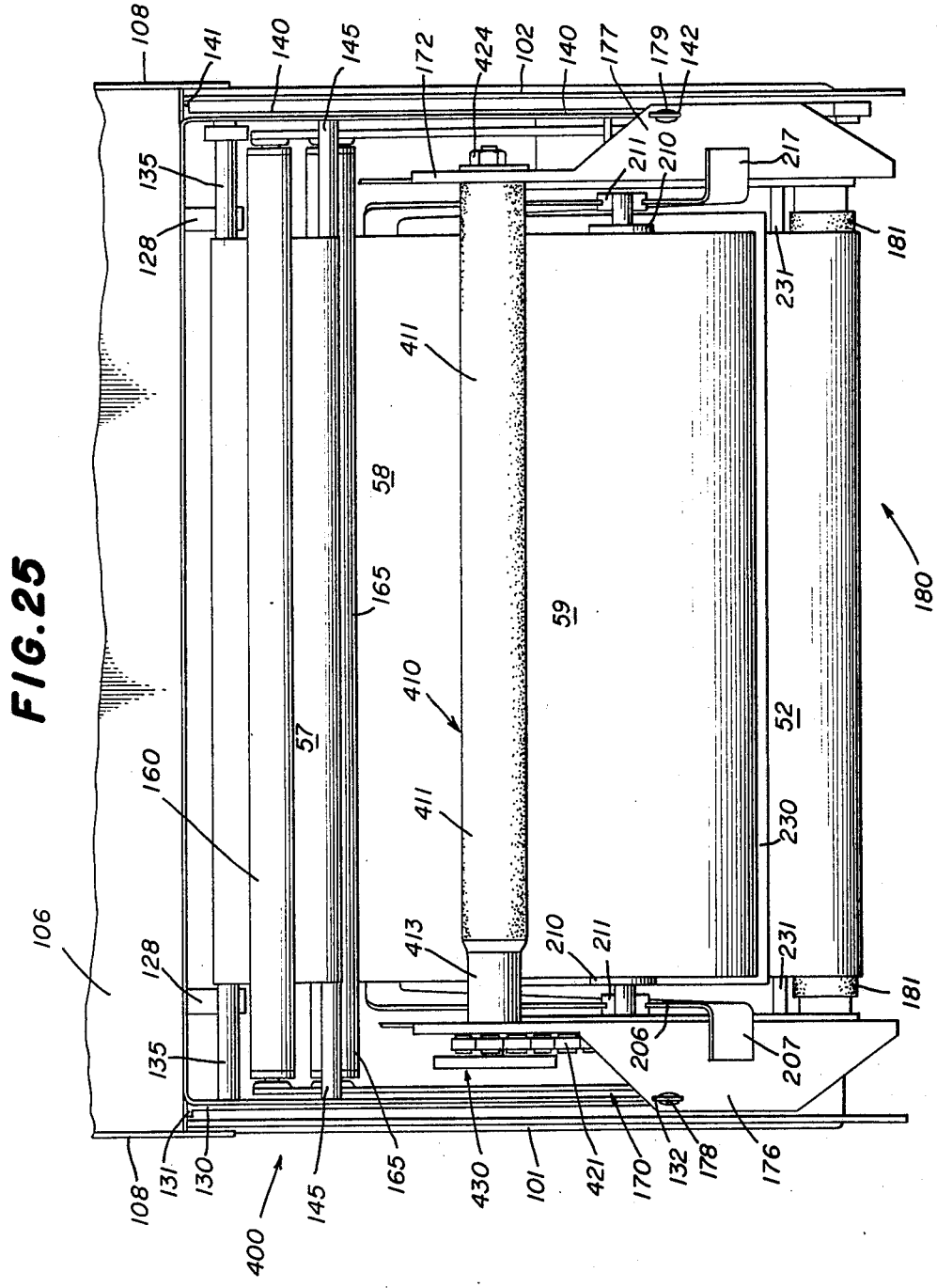

March 24, 1970 R. L. STEINER ET AL 3,502,383
TOWELING DISPENSER WITH LOOP CONTROL
Filed May 7, 1968 13 Sheets-Sheet 12

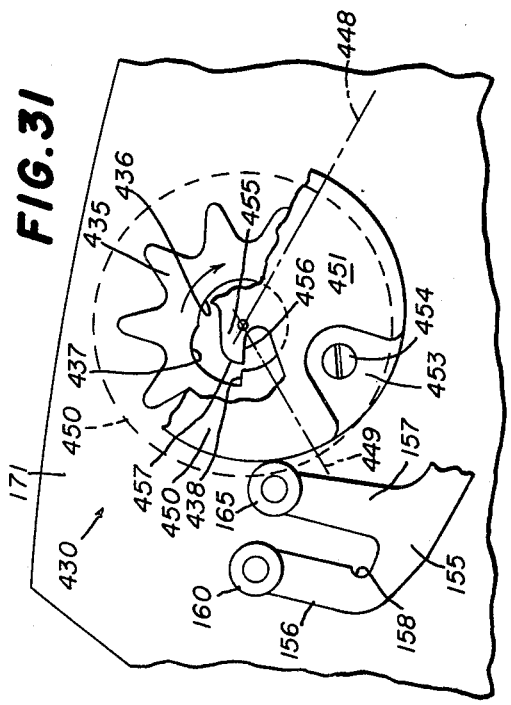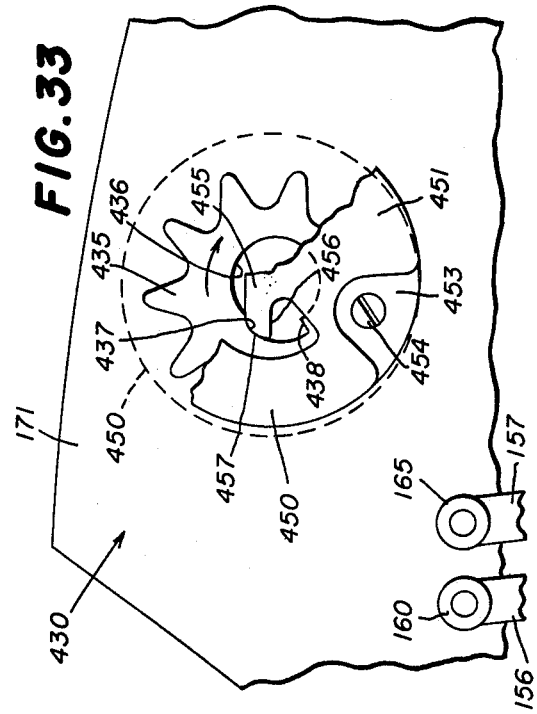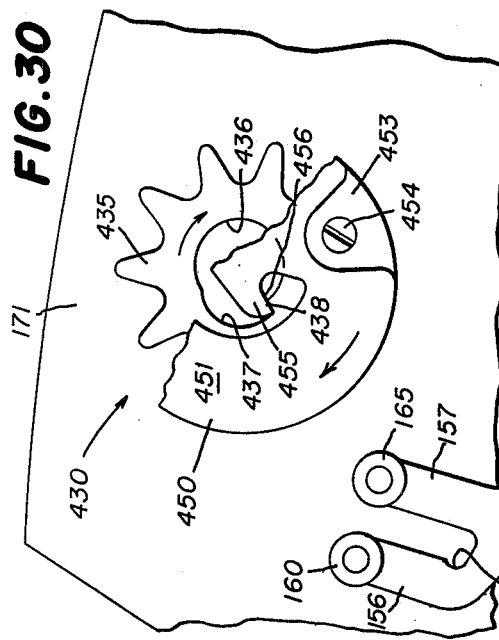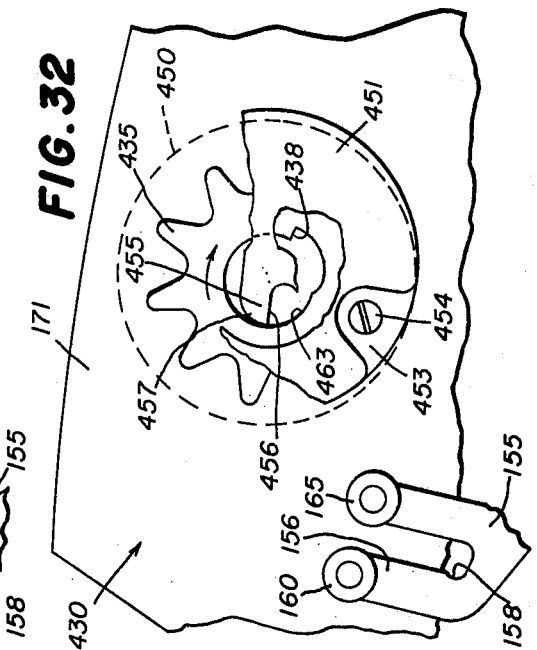

United States Patent Office 3,502,383
Patented Mar. 24, 1970

3,502,383
TOWELING DISPENSER WITH LOOP CONTROL
Robert L. Steiner, Wilmette, and Erwin B. Bahnsen, Hinsdale, Ill., assignors to Steiner American Corporation, Salt Lake City, Utah, a corporation of Nevada
Filed May 7, 1968, Ser. No. 727,157
Int. Cl. A47f 1/08
U.S. Cl. 312—38          34 Claims

ABSTRACT OF THE DISCLOSURE

There is disclosed a toweling dispenser of the continuous type having a housing with a loop of toweling that extends along an exit path from a clean towel supply within the housing to an exposed use position accessible to a user, and thence along a return path to a soiled toweling storage position within the housing, the dispenser having drive mechanism interconnecting a dispensing mechanism and a take-up mechanism that takes up soiled toweling at a rate greater than that at which clean toweling is dispensed, and control mechanism responsive to the length of toweling in the loop for rendering the take-up mechanism temporarily ineffective when the length of toweling in the loop reaches a predetermined value, whereby to maintain substantially constant the average length of toweling in the loop at the exposed use position accessible to a user; there also are provided novel anti-milking devices and novel toweling braking devices.

---

The present invention relates generally to improvements in dispensing mechanisms, and more particularly to improvements in the construction and operation of toweling dispensers, which improvements are especially well-adapted for use and incorporation in toweling dispensers of the continuous type, wherein the toweling is made available to the user in the form of a loop of toweling located, in most cases, beneath the dispenser structure.

It has heretofore been known in towel-dispensing cabinets and dispensers of the continuous-toweling type to provide a dispensing cabinet having provided therein a supply roll of clean toweling in which the toweling itself may be as much as 50 yards long. The roll of clean toweling is suitably supported in the dispensing cabinet for rotation or for rolling rotation, so that the clean toweling may be progressively fed from the roll thereof. In such dispensers the clean toweling is commonly fed out of the front portion of the cabinet into a toweling loop which hangs beneath the cabinet structure, the front or forward leg of the loop presenting toweling to the user in what may be considered a use position, with the loop having a rear leg which extends upwardly into the dispenser cabinet structure and passes upwardly therein through a suitable opening provided in the bottom of the cabinet adjacent its rear. An example of such prior dispensers may be seen in the U.S. patent to R. G. Birr, No. 2,899,251. In that representative prior dispenser, the clean toweling is led over a measuring roll within the dispenser cabinet, thence around a pinch roll, and then out of the forward side of the cabinet into the front leg of the depending toweling loop. In most of the prior toweling dispensers of the type just referred to, the clean toweling, from the supply thereof, is withdrawn from the cabinet by the operator who grips the forward leg of the depending loop and pulls downwardly thereon. As the length of the clean toweling is fed out of the cabinet and into the front leg of the loop, other mechanism within the cabinet simultaneously winds up what is intended to be an equal length of the soiled toweling from the rear leg of the loop. In this manner, the depending toweling loop beneath the dispenser is sought to be maintained at substantially a constant length, although that result is not always obtained, as shall be pointed out below.

In prior toweling dispensers of the kind shown in Patent No. 2,899,251, it will be understood that, after a user has withdrawn a length of toweling from the cabinet and has dried his hands thereon, he leaves exposed, at the front portion of the depending loop, that part of the toweling which he has just used. Thus, the soiled portion of the toweling just used remains in the loop in the position at which the next user of the toweling will grip the towel for the purpose of withdrawing a new length of toweling. Those portions of the toweling loop used by still earlier users constitute the remaining portions of the depending loop. Thus, for the most part, substantially the entirety of the depending loop of toweling is soiled and in an unsanitary condition.

The depending toweling loops in the early dispensers, which dispensers may be referred to as "sustained depending loop type dispensers," presented an unpleasant appearance because of their soiled condition, and some health authorities objected to the public use of toweling dispensers of the kind just referred to, because subsequent users might grip and handle a portion of the depending toweling loop which previously had been soiled. Because the entire front leg of the depending toweling loop was readily available to the user in such prior continuous toweling dispensers, the user might grip a soiled portion of the front leg preparatory to withdrawing a fresh length of clean toweling from the dispenser, and, in some cases, the user, rather than withdrawing a clean length of toweling, might simply dry his hands and/or face on that portion of the depending front leg of the loop that has previously been soiled. Indeed, rather than withdraw a fresh length of toweling, some users might handle and dry their hands and/or faces on both the soiled portion of the front leg of the loop and the soiled rear leg portion of the loop.

In order to overcome the disadvantages referred to above, and others, with respect to toweling dispensers of the general kind shown in said U.S. Patent No. 2,899,-251, there was developed another type of dispenser, as illustrted in the U.S. patent to Bahnsen, No. 3,323,848, for example, having new and novel means therein by which the soiled toweling loop is automatically withdrawn from its use position when a user has completed his drying operation, thereby avoiding the unpleasant appearance of exposed soiled toweling and avoiding the tendency for the next user to handle or use the previously-soiled toweling. In the latter dispenser, which may be called a "loop retracting" type dispenser, the soiled loop of toweling is retracted from its use position, with a portion of the soiled toweling loop being retracted automatically into storage position within the dispenser cabinet and the remaining portion of the soiled toweling being retracted upwardly against the bottom of the cabinet in a position wherein that portion of the toweling cannot readily be grapsed by the next user preparatory to withdrawal of another clean length of toweling.

The arrangement is such as to permit the next user of the dispenser to grip only clean toweling prepartory to his withdrawal of additional clean toweling from the dispenser; and to permit the user, simultaneously with his withdrawal of clean toweling, also to withdraw, from a retracted and storage position within the dispenser, a length of previously-used toweling, so that the loop which will thereupon depend below the dispenser will be comprised in its front leg of clean and fresh toweling, with at least a portion of the back leg of the loop being comprised of soiled toweling, the soiled portion of the depending loop being in the upper portion of the rear leg of the loop where it is not likely to be handled by the user.

However, in the prior "sustained depending loop" type of dispensers, of which Patent No. 2,899,251 illustrates one example, and in the "loop retracting" type dispensers, such as that shown in my Patent No. 3,323,484 (and in all other towel dispensers of the continuous type of which we are aware), there has remained unsolved the matter of providing, in a completely reliable way, a toweling loop of a constant length for the use of the person who wishes to dry his hands or face. Despite the most careful construction and other precautions taken by the manufacturers of the dispensers and by those who maintain and service them, the users of the dispensers often find that the lengths of the loops of toweling available for use, gradually lengthen or gradually shorten during the successive dispensing operations. In the case of the "sustained depending loop" type dispenser, the loop of toweling hanging below the cabinet often gradually lengthens or shortens, in spite of the fact that the amount of dirty toweling wound up during each dispensing operation is supposed to be exactly equal to the amount of clean toweling dispensed. Similarly, in the "loop retracting" type of dispenser, the total length of the extracted or withdrawn loop of toweling (comprised of a length of soiled toweling withdrawn from the interior of the dispenser, plus that portion of the toweling which previously extended across the bottom of the dispenser, plus a length of clean toweling newly dispensed from the clean toweling supply within the dispenser) is often found gradually to lengthen or to shorten during succesive dispensing operations.

In each of said prior dispenser types, the desired constancy in the lengths of the usable toweling loops has been sought to be accomplished by the use of measuring rolls over which clean toweling is led, in combination with soiled toweling take-up drive rolls which are driven by the measuring rolls and at the same surface speeds. Means are normally provided to minimize slippage of the toweling with respect to the surface of the measuring roll and the take-up drive roll, and the intention is that the amount of soiled toweling that is wound up during each dispensing operation will be exactly equal to the amount of clean toweling withdrawn, thereby maintaining the toweling loop at a constant length; but this desired result is not always obtained because there are numerous factors that are often present that tend to prevent the desired result from being reached. For example, different textures and different weaves of the toweling materials will cause the materials to coact differently with the measuring rolls and the take-up drive rolls. Toweling materials of certain textures and weaves tend to slip much more readily with respect to the measuring rolls and soiled toweling take-up drive rolls, than do others. Different surface conditions of the toweling due to ironing, or absence of ironing, and due to the age of the toweling, and due to whether the toweling material has been wound with the high nap side in or out, often make a substantial difference. Variations in the transverse structure of the toweling, due to the presence of patches and selvage edges and the like, also often cause slippage of the toweling with respect to the rolls. Variations in the lengths of the toweling loops also sometime come about when the material becomes wet or damp. For example, when the toweling has been stretched during the ironing process the fibers tend to relax and become shortened when they become wet or damp during use of the toweling, thereby tending to cause the loop to shorten.

One of the principal objects of the present invention is to provide a toweling dispenser of the continuous type having highly improved and novel means for maintaining substantially constant the average length of the loop of free toweling that is available to the user upon each dispensing operation.

Another object of the invention is to provide a continuous toweling dispenser of the character just referred to, having mechanism for taking up soiled toweling simultaneously with, but at a rate more rapid than, the dispensing of the clean toweling, and control mechanism responsive to the length of toweling in the loop for interrupting the taking up of the soiled toweling when the length of toweling in the loop reaches a predetermined value, whereby the average length of the toweling loop is maintained substantially constant. A further object of the invention is to provide a continuous dispenser of the kind just stated, wherein the taking up of the clean toweling is interrupted by the control mechanism without regard to whether the dispensing of the clean toweling has then yet been completed.

A toweling dispenser satisfying the objects just stated may have a loop of toweling that extends along an exit path from a clean toweling supply within the dispenser to an exposed use position accessible to a user, and then along a return path to a soiled toweling storage position within the dispenser. The dispenser includes a reasonably accurate, but not necessarily exact, dispensing mechanism for dispensing a substantially predetermined length of clean toweling from the clean toweling supply into the loop and into use position exteriorly of the dispenser upon each dispensing operation, and mechanism connected to the dispensing mechanism for taking up soiled toweling at the soiled toweling storage position simultaneously with, but at a rate more rapid than, the dispensing of the clean toweling. The dispenser also includes control mechanism responsive directly or indirectly to the length of toweling in the loop for interrupting the taking up of the soiled toweling when the length of toweling in the loop reaches a predetermined value.

Thus, if we assume that at the beginning of a dispensing operation the length of the loop is too short, the dispensing mechanism and the soiled toweling take-up mechanism will start respectively to feed clean toweling into one end of the loop and simultaneously take up soiled toweling from the other end thereof, but, since the length of the loop is too short, the control mechanism will very quickly act to interrupt the toweling take-up operation, with the result that the continued operation of the dispersing mechanism will add to the net length of toweling in the loop and will either correct or tend fully to correct the loop length. If full correction is not obtained during the first dispensing operation, the full correction will be achieved during the second or subsequent dispensing operations. On the other hand, if we assume that at the beginning of a dispensing operation the length of the loop is too long, the control mechanism (which is responsive to the length of toweling in the loop) will be slow to interrupt the taking up of soiled toweling and the result will be that the net length of the loop will be shortened because of the fact that the soiled toweling take-up takes place at a rate faster than the rate at which clean toweling is fed into the loop by the dispensing mechanism. If the loop is already at the proper length at the time a dispensing cycle is begun, the toweling take-up operation will initially tend to overwind and shorten the loop because the rate of take-up is greater than the rate at which clean toweling is fed into the loop, but the control mechanism will interrupt the take-up operation at the proper time to cause the total length of take-up to be substantially equal to the length of clean toweling fed into the loop during the dispensing cycle, with the result that the net length of the loop will remain substantially unchanged.

A further object of the present invention is to provide a continuous toweling dispenser having means for positively preventing the continued withdrawal or "milking" of soiled toweling after the completion of a dispensing cycle. Yet another object of the invention is to provide in the dispenser means for positively preventing the improper withdrawal or "milking" of clean toweling from the dispenser following completion of a dispensing cycle.

These and other important objects and advantages of the present invention will be apparent from the following description of certain preferred embodiments thereof, taken with the accompanying drawings wherein:

FIG. 4 is an enlarged front elevational view of the dispenser of FIGS. 1 and 2, but with the cover and front of the cabinet removed and with the clean toweling supply roll being omitted;

FIG. 5 is a top plan view of the dispensing mechanism, with the cover thereof being broken away and being shown as pivoted to an exaggerated open position;

FIG. 7 is a fragmentary cross-sectional view taken substantially along the line 7—7 in FIG. 5 primarily to show the time-stop mechanism in its side elevation;

FIG. 8 is an enlarged fragmentary cross-sectional view taken substantially along the line 8—8 in FIG. 7, showing a front view of a portion of the time-stop mechanism, partly in section, employed in the dispenser;

FIG. 9 is an enlarged fragmentary rear view of the time-stop mechanism taken substantially along the line 9—9 in FIG. 7;

FIG. 10 is a vertical cross section through the dispenser similar to FIG. 6, but with the cover of the cabinet shown in an open and elevated position and with the toweling retracting links and rollers raised to their highest elevation, the position they occupy when the cabinet is being loaded with fresh toweling;

FIG. 11 is a schematic, vertical cross section, with the right-hand side of the cabinet removed, to show the position of the principal parts of the dispensing cabinet in their normal condition before a dispensing operation has been initiated;

Figure 17:
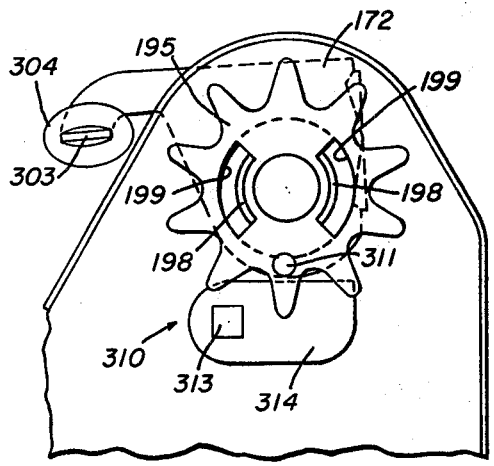
Figure 18:
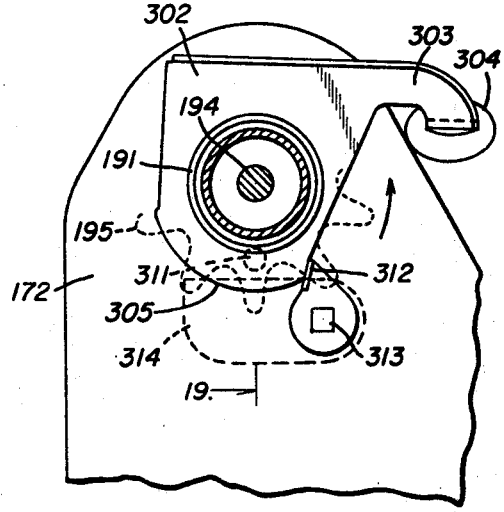
Figure 19:
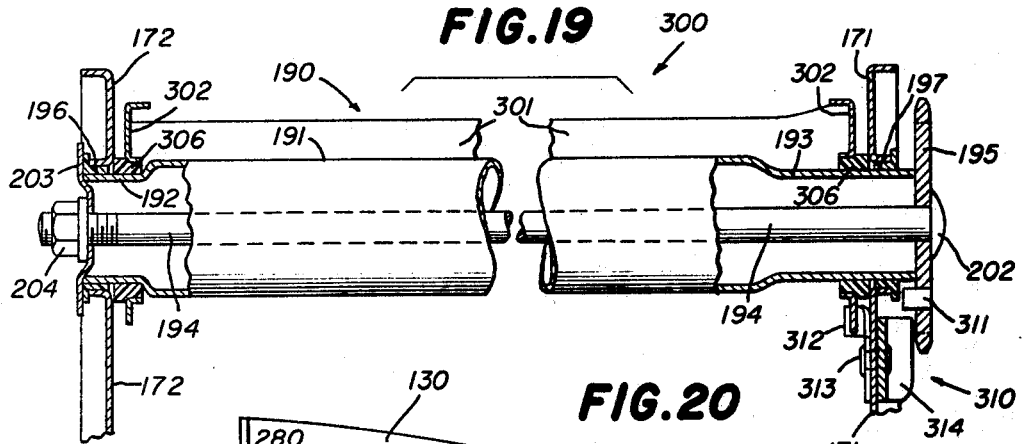
Figure 20:
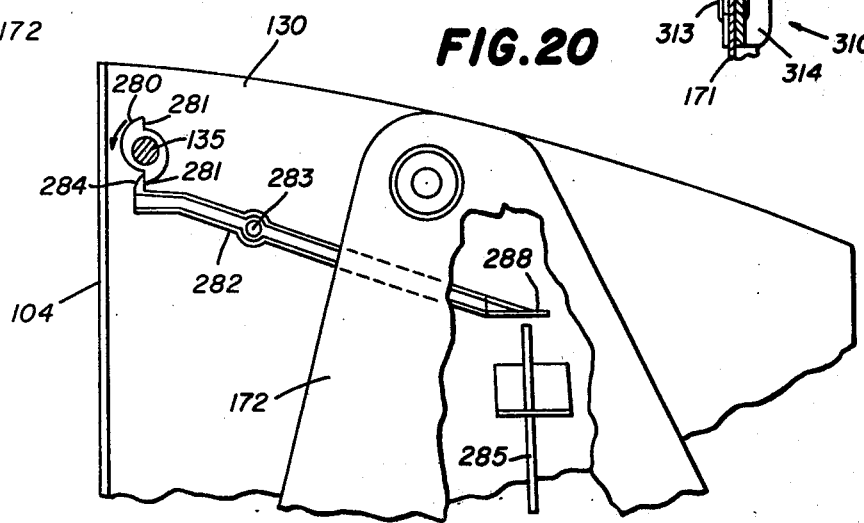
Figure 26:
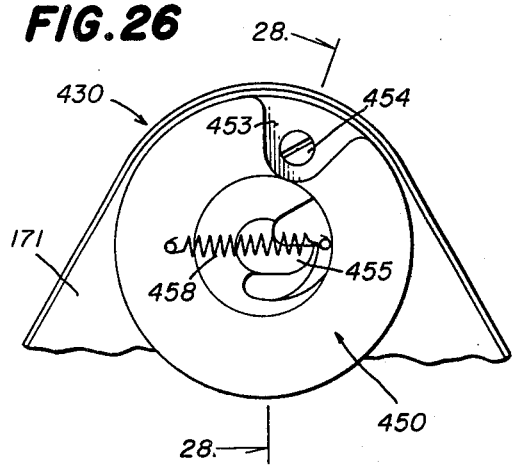
Figure 27:
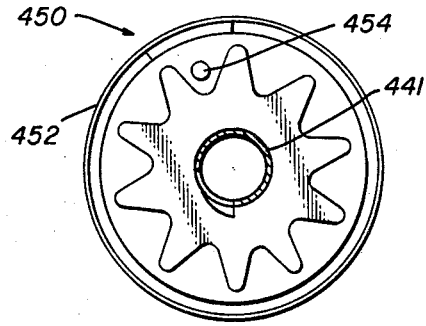
Figure 28:
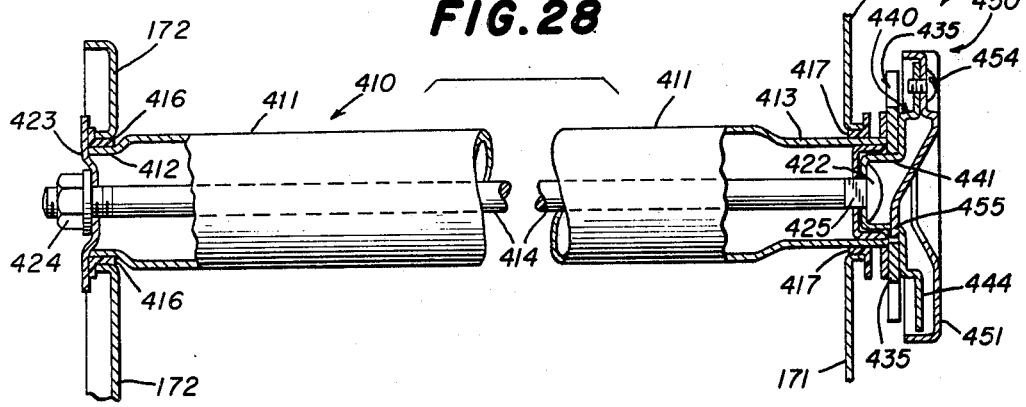
Figure 29:
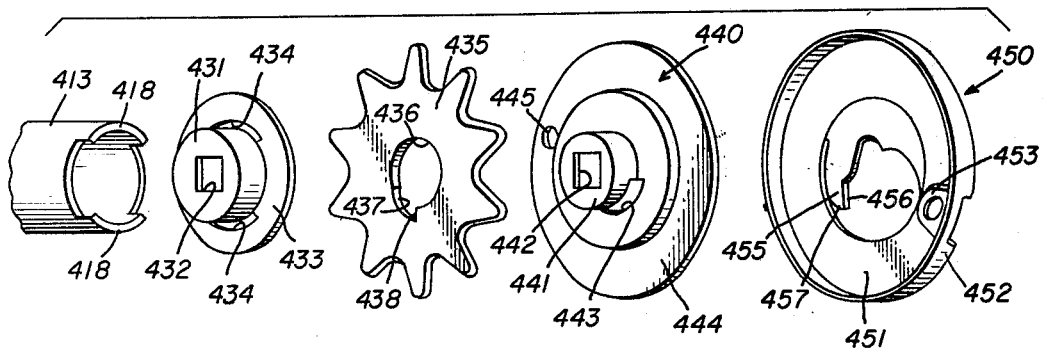

FIG. 12 is a view similar to FIG. 11, but schematically showing the internal parts of the dispensing cabinet in the position occupied thereby when the user of the cabinet has withdrawn therefrom the full toweling loop for use purposes, and before the time-stop mechanism has timed out to permit the internal parts of the structure to return to the loop-retracting normal position thereof shown in FIG. 11;

FIG. 13 is a view similar to FIG. 12, but showing the parts after the time-stop mechanism has timed out and as the parts move back toward their normal at-rest positions shown in FIG. 11, the loop of toweling being retracted during this movement;

FIG. 14 is an enlarged fragmentary cross-sectional schematic view of the parts of the dispenser seen in the upper portion of FIG. 12, showing the relationship of the parts during the withdrawal of the loop of toweling to its use position, with the towel take-up rolls raised by the withdrawal of soiled toweling from the interior of the dispenser, but before the rolls have actuated the control mechanism to interrupt and stop the taking up of soiled toweling;

FIG. 15 is a view like FIG. 16, but showing the control mechanism in its actuated condition, wherein it has interrupted the take-up of soiled toweling;

FIG. 16 is a similar view, but showing how the rearmost take-up roll will move past a bumper on the control mechanism to a position above the bumper, thus failing to move the control mechanism to its actuated position, when the cabinet is opened or if the rear leg of the depending toweling loop is improperly pulled;

FIG. 17 is an enlarged fragmentary view of the upper left-hand portion of the dispenser, substantially as viewed along the line 17—17 in FIG. 4, with certain parts such as the drive chain omitted, showing an anti-milking mechanism which may be embodied in the structure to prevent surreptitious pulling of either soiled or clean toweling from the dispenser, the anti-milking mechanism and the arms of the loop-control means being shown in their normal at-rest position;

FIG. 18 is a similar view of the anti-milking mechanism, taken substantially along the line 18—18 in FIG. 4;

FIG. 19 is a fragmentary detailed view, partly in cross section, taken substantially along the line 19—19 in FIG. 18, to show details of the soiled toweling take-up drive roll and its mounting;

FIG. 20 is an enlarged fragmentary schematic view showing a brake mechanism which is operative during the timed period during which the user of the dispenser has a free-hanging length of toweling at his disposal, to prevent the rotation of one of the rollers in the dispenser and thereby prevent a movement of the toweling that would permit the take-up rolls prematurely to drop and cause the retraction of the freely-hanging loop of toweling;

FIG. 21 is an enlarged fragmentary schematic view of the anti-milking apparatus in its normal position;

FIG. 22 is a similar view showing the position of the parts after the loop control mechanism has been actuated, but before the anti-milking mechanism has caused complete interruption of the movement of all parts of the dispenser;

FIG. 23 is a similar view showing the parts in the position they occupy when the anti-milking mechanism has brought the operation to a complete halt;

FIG. 24 is a front view of a dispenser similar to FIG. 4, but showing the dispenser modified by the installation of a mechanical clutch which serves to interrupt the take-up of soiled toweling at the proper time;

FIG. 25 is a top plan view of the apparatus of FIG. 24;

FIG. 26 is an enlarged fragmentary eelvational view of the clutch apparatus taken substantially along the line 26—26 in FIG. 24;

FIG. 27 is a similar view taken substantially along the line 27—27 in FIG. 24;

FIG. 28 is a fragmentary view, partly in section, taken substantially along the line 28—28 in FIG. 26, and substantially along the axial length of the soiled toweling take-up drive roll, in order to show important details of the mounting of the soiled toweling take-up drive roll and of the clutch;

FIG. 29 is an exploded view of the parts of the clutch;

FIG. 30 is an enlarged fragmentary schematic view of the clutch and of the soiled toweling retracting rolls in their normal positions;

FIG. 31 is a similar view showing the condition of the parts when the loop-retracting rolls have been raised to engage the periphery of the clutch mechanism;

FIG. 32 is a similar view showing the relationship of the parts after the clutch and the soiled toweling take-up drive roll have been rotated approximately 140° beyond the position of the clutch illustrated in FIG. 31; and FIG. 33 is a similar view showing the relative position of the parts at a further stage in the movement of the clutch mechanism.

As illustrated in the drawings, the towel dispenser of the present invention is in the form of a dispensing cabinet 100 that is generally box-shaped and is equipped to dispense clean toweling 50 from a supply position to a use position and thence to a soiled toweling storage position as is diagrammatically illustrated in FIGS. 11 to 13 in the drawings. As seen in FIG. 11, the clean toweling is in the form of a supply roll 51 disposed in the lower portion of the dispensing cabinet 100, a reach 52 of clean toweling being withdrawn from the underside thereof and passed through a dispensing mechanism 180 and thence downwardly to a use position past a spacing member 125, the reach 52 having side edges 53 and 54 in position to be grasped by a user adjacent to the spacing member 125. Disposed rearwardly or to the right from the reach 52 of clean toweling is a reach 55 of soiled toweling that is exposed on the underside of the cabinet 100 but positioned within a channel 115 on the underside thereof which tends to conceal the reach 55 and to prevent unintentional contact thereof by a user. From the rear end of the reach 55 of soiled toweling extends a vertical reach 56 of soiled toweling directed upwardly into the dispensing cabinet 100 at the rear thereof and passing over a brake roller 135 and connecting with a U-shaped reach 57 of soiled toweling extending downwardly under a take-up roller 160 and thence upwardly around and over an intermediate roller or loop roller 145 where it joins a final reach 58 of soiled toweling extending downwardly around a take-up roller 165 and thence to the underside of a soiled toweling storage roll 59 disposed in the upper portion of the dispensing cabinet 100.

Figure 1:
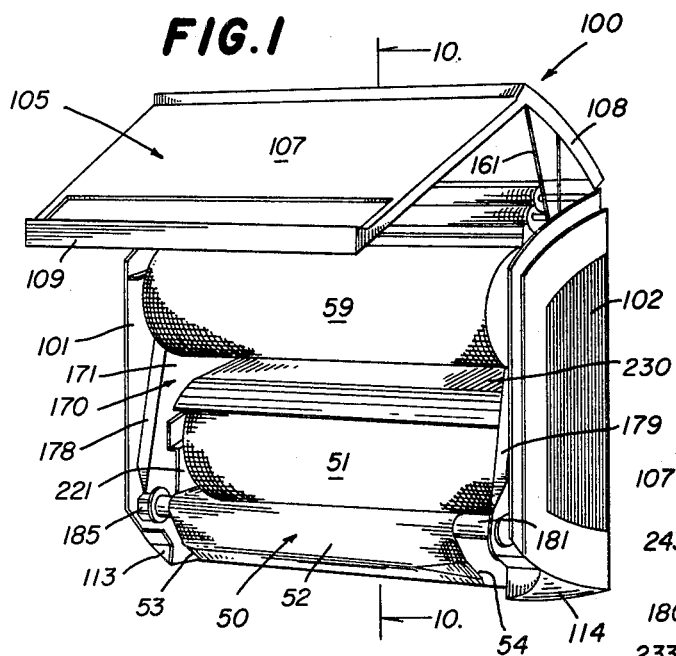
FIGURE 1 is a perspective view of a toweling dispenser of the continuous-toweling type embodying, and constructed in accordance with, the present invention, the dispenser being shown with its top and front cover in the raised or open position so as to show a portion of its interior and to illustrate the clean toweling roll and the soiled toweling roll within the cabinet.

Considering now the details of construction of the dispensing cabinet 100, there are provided two side walls 101 and 102 formed of plastic, the side walls 101 and 102 having the general shape illustrated in FIGS. 1 and 5 and being identical in construction to each other except that one is the mirror image of the other. The side walls 101 and 102 are joined by a vertically arranged metallic rear wall 104 along the rear edges thereof, suitable fasteners such as rivets 103 joining the side walls 101–102 to the rear wall 104. The rear wall 104 may be provided with a plurality of stud openings or the like (not shown) by which the cabinet 100 may be removably mounted upon a wall or other support structure. Covering the top of the dispensing mechanism 100 and the front thereof is a cover 105, preferably formed of metal, and including a top portion 106 and a front portion 107, the portions 106 and 107 being provided with side flanges 108 on either side thereof and disposed normal thereto and overlying adjacent portions of the side walls 101 and 102 when the cover 105 is in the closed position thereof. The lower edge of the cover 105 carries a rearwardly directed flange 109 thereon and the upper edge of the cover 105 is hingedly connected to the upper edge of the rear wall 105 as by a piano hinge 110.

There is provided at the bottom of the dispensing cabinet 100 a bottom plate or floor plate 111 (see FIG. 6) arranged generally horizontally and extending the width of the cabinet 100 and having the side edges thereof secured to the side walls 101 and 102, respectively. It will be noted that the side walls 101 and 102 extend downwardly below the floor plate 111 and more particularly carry thereon downwardly extending curved members 113 and 114, respectively, which define therebetween the channel 115 referred to hereinabove. The rear edge of the floor plate 111 is spaced forwardly from the rear wall 104 and carries thereon a plastic panel 117 which is secured to the rear portion of the floor plate 111 such as by rivets 103, the panel 117 having a hinge as at 118 extending the width of the cabinet 100. The rear edge of the panel 117 is spaced a short distance from the rear wall 104 to provide therebetween an opening 120, the hinged panel 117 being particularly useful to trap the trailing toweling and after retraction into the cabinet and during the loading of clean toweling into the cabinet 100.

The forward edge of the floor plate 111 terminates a substantial distance from the front portion 107 of the cover 105 and carries thereon an upwardly extending flange 121 which in turn carries on the upper edge thereof a forwardly directed ledge 122 upwardly inclined and carrying on the upper edge thereof an upturned lip or flange 123. As is best seen in FIG. 4, the ledge 122 carries thereon a lock 124 which is key operated and is connected to linkages and latches of common and well-known construction (not illustrated), which may cooperate with the cover 105 of the cabinet 100 to secure the cover 105 in the closed position. The ledge 122 also carries thereon the spacing member 125 that has been referred to hereinabove, the spacing member 125 serving to hold the reach 52 of clean toweling disposed forwardly of the channel 115 in a position such that a user can grasp the edges 53 and 54 thereof during the pulling of a length of clean toweling from the supply roll 51, all as will be explained more fully hereinafter. In passing it is pointed out that the edges of the reach 55 of soiled toweling are covered by the curved members 113 and 114 and are not in a position accidentally to be touched by the hands of the user.

Figure 6:
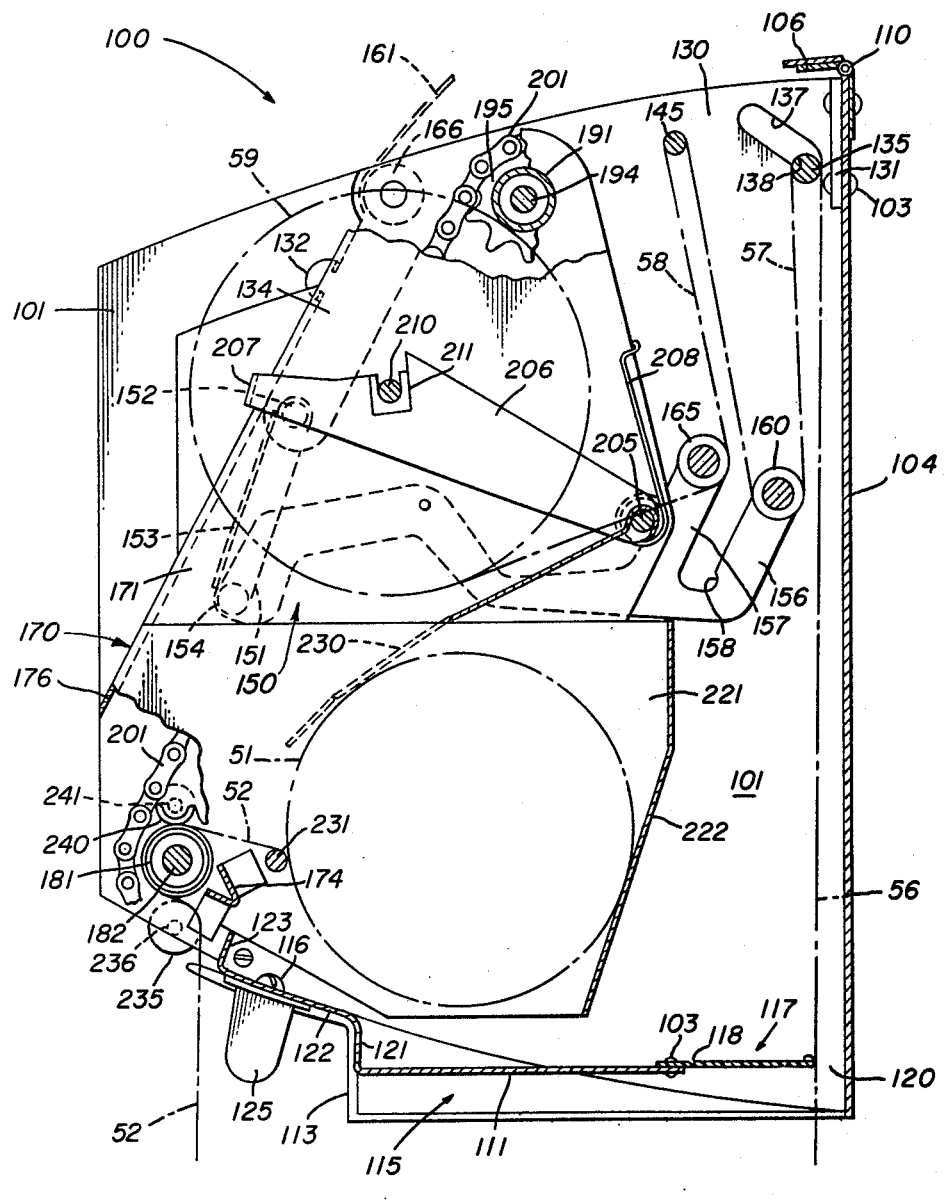
FIG. 6 is a vertical cross-sectional view taken substantially along the line 6—6 in FIG. 5, with certain of the parts being omitted and/or cut away for clearness of illustration, the parts being shown in the positions occupied thereby when the user has completed his use of a loop of toweling and the loop has subsequently been retracted.

Referring now to FIGS. 4, 5 and 6, there are illustrated mechanism support brackets 130 and 140 which are respectively mounted on the left-hand and right-hand sides of the cabinet 100, as viewed from the front, the brackets 130 and 140 being disposed respectively adjacent to the side walls 101 and 102. The mechanism support bracket 130 has the general shape illustrated in FIG. 6 and includes a mounting flange 131 at the rear thereof disposed normal thereto and lying against the rear wall 104 and suitably secured thereto as by rivets 103. The forward portion of the bracket 130 carries a forwardly and downwardly extending leg 134. The rear portion of the bracket 130 carries an upwardly and forwardly directed slot 137 having a vertical slot portion 138 in the lower rear portion thereof in which is supported the brake roller 135 referred to hereinabove. The support bracket 140 is identical in construction to the support bracket 130, except that it is formed as the mirror image thereof, whereby like numbers in the 140 series of numbers have been applied to those parts which correspond to the above described parts in the 130 series of numbers. It will be understood that the support brackets 130 and 140 support therebetween the brake roller 135 about a transverse axis that can be shifted along the slots, such as the slots 137 and 138 in the support bracket 130. The support brackets 130 and 140 also support the loop roller 145 mentioned above, the loop roller 145 being mounted to rotate upon a fixed axis in its supported position between the support brackets 130 and 140, that position being forwardly with respect to the brake roller 135.

The support brackets 130 and 140 also carry thereon a soiled toweling retraction and storage mechanism generally designated by the numeral 150, which mechanism 150 comprises a series of links and arms which support the take-up rollers 160 and 165 mentioned above. A set of links and arms is provided on each side of the cabinet 100 in association with the adjacent support bracket 130 or 140, as the case may be, whereby like reference numerals have been applied to the like parts on each side of the mechanism 150. Describing the mechanism 150 mounted on the support bracket 130 with particular reference to FIGS. 6 and 10, it is pointed out that there is mounted adjacent to the lower end of the leg 134 a link 151, the link 151 being mounted on the leg 134 by a pivot pin 152. The underside of the link 151 carries an outwardly directed flange 153 disposed normal thereto and extending substantially the length thereof to provide rigidity for the link 151 and also for use in the operation thereof as will be described hereinafter. The other end of the link 151 has pivoted and connected thereto as by a pivot pin 154 a take-up arm 155 having the shape and construction best illustrated in FIGS. 6 and 10. The end of the arm 155 opposite the pivot pin 154 has a pair of upwardly extending spaced-apart fingers 156 and 157 thereon, the base of the fingers 156 having an upwardly extending notch 158 therein for cooperation with the loop roller 145 during the loading of fresh toweling into the cabinet 100 as will be explained more fully hereinafter.

The two take-up arms 155 support therebetween the take-up rollers 160 and 165, the outer ends of the fingers 156 supporting the take-up roller 160 therebetween and the outer ends of the fingers 157 supporting the take-up roller 165 therebetween. Interconnecting the cover 105 and the take-up arms 155 are cables 161, one end of each cable 161 being attached by a connector 162 to the adjacent arm 155 and the other end of the cable 161 being attached by a connector 163 to the cover 105, and specifically to one of the side flanges 108, the cable 161 passing over a guide 166. The cables 161 are useful in automatically lifting the take-up arms 155 and the take-up rollers 160 and 165 mounted thereon to the elevated position illustrated in FIG. 10 upon the opening of the cover 105, such opening of the cover 105 being typically used to load fresh toweling into the cabinet 100. With the parts in position illustrated in FIG. 10, it will be seen that the notches 158 in the fingers 156 receive therein the loop roller 145 whereby the weight of the mechanism 150 is supported by the loop roller 145 during the loading operation. Also there has been provided an arm 126 to hold the cover 105 in the elevated or open position thereof. In this connection there also is provided a brake roller lifter bracket 128 mounted on the cover 105 and engaging below the brake roller 135 to move it from the slot portions 138 to the upper ends of the slots 137 when the cover 105 is opened, it being understood that two of the brackets 128 are provided, one on each side of the cover 105. Finally, there is provided a surface 164 on the forward portion of each of the take-up arms 155 which cooperates with the flange 153 on the associated link 151 so as to cause generally vertical movement of the take-up rollers 160 and 165 during the operation of the cabinet 100.

The dispensing cabinet 100 also includes a removable mechanism frame generally designated by the numeral 170, which frame 170 is also supported upon the support brackets 130 and 140. As is best illustrated in FIGS. 4, 5, 6 and 10, the frame 170 includes two side plates 171 and 172 formed substantially identical to each other, but as mirror images one of the other, the shape of the side plate 171 being illustrated in FIG. 6 of the drawings and the shape of the side plate 172 being generally illustrated in FIG. 7 of the drawings. The side plates 171 and 172 are connected by a cross member 174. Also provided and extending between the side plates 171 and 172 is a cross rod 175, the cross member 174 and the cross rod 175 assisting in holding the side plates 171 and 172 in substantially parallel relationship to provide the removable mechanism frame 170.

In order to mount the frame 170 on the support brackets 130 and 140, the side plates 171 and 172 are provided respectively with outwardly directed flanges 176 and 177 which are in turn respectively provided with openings 178 and 179 therein. The openings 178 and 179 respectively receive therethrough supports 132 and 142 that are on the support brackets 130 and 140, respectively, whereby removably to support the mechanism frame 170 in the operative position within the dispensing cabinet 100.

Referring now to FIGS. 3 to 6 of the drawings, there are illustrated the details of a toweling dispensing mechanism 180 forming a part of the dispensing cabinet 100 and supported upon the removable mechanism frame 170. The dispensing mechanism 180 includes a measuring roll 181, the surface of which may be covered with sandpaper or other granular material which will tend to prevent the toweling from slipping thereupon. The measuring roll 181 may be of hollow construction with a shaft 182 extending therethrough. The left-hand end of the measuring roll 181, as viewed in FIG. 4, is rotatably mounted in a suitable bearing 183 provided in the side plate 171, and the left-hand terminal end of the measuring roll 181 extends through the side plate 171 and has fixed thereon on the outer side of the side plate 171 a toothed sprocket 185. The right-hand end of the measuring roll 181 is rotatably journalled in a suitable bearing 184 in the side plate 172, and the right-hand terminal end of the measuring roll 181 extends through the side plate 172 and has fixed thereon a threaded stop member forming a part of a time-stop mechanism 250 which will be described in greater detail hereinafter.

At the upper ends of the side plates 171 and 172, there is provided a soiled toweling take-up mechanism 190, the details of construction thereof being best illustrated in FIGS. 10 to 23. The take-up mechanism 190 includes a take-up drive roll 191, which like the measuring roll 181, has a sandpaper or other granular surface thereon to minimize slipping of the toweling thereupon. The take-up drive roll 191 is formed hollow (see FIG. 19) and includes a shorter reduced end 192 disposed to the left and extending through a flanged opening in the side plate 172 and supported therein on a bearing 196 which may be formed of a suitable lubric plastic. The other end of the drive roll 191 has a longer reduced end 193 that extends through a flanged opening in the side plate 171 and is supported therein in a suitable bearing 197 also formed of a lubric plastic. Extending through the hollow drive roll 191 is a shaft 194 carrying on one end thereof a toothed drive sprocket 195 receiving projections 198 on the drive roll 191 through arcuate slots 199 therein, the adjacent end of the shaft 194 having a head 202 thereon to hold the sprocket 195 in the operative position. An annular end plate 203 closes the other end of the drive roll 191 and is held in position thereon by a nut 204 engaging a threaded portion of the shaft 194.

A drive mechanism 200 interconnects the dispensing mechanism 180 and the take-up mechanism 190, and specifically the dispensing roll 181 and the take-up drive roll 191, the drive mechanism including the sprockets 185 and 195 and a chain 201 interconnecting the sprockets 185 and 195. For reasons which will be explained more fully hereinafter, the sprockets 185 and 195 have the same number of teeth and are of equal size, whereby the angular rotation of the sprocket 185 is duplicated by the sprocket 195.

Below the take-up drive roll 191 and adjacent to the rear of the side plates 171 and 172, there is provided a transversely extending rotatable shaft 205 that is suitably journalled at its respective opposite ends in the side plates 171 and 172. Fixedly secured adjacent to the opposite ends of the shaft 205 and positioned inwardly of the associated side plates 171 and 172 are two yoke arms 206 and 216 respectively disposed adjacent to the side plates 171 and 172 repsectively, the yoke arms 206 and 216 extending forwardly and upwardly as best seen in FIGS. 6 and 10. The yoke arms 206 and 216 are formed substantially identical to each other but as the mirror image of each other, each having a bearing 211 thereon that support a soiled toweling support roll 210 therebetween. Laterally outwardly extending handles 207 and 217 are respectively provided on the yoke arms 206 and 216 to facilitate movement thereof during the loading of toweling into the cabinet 100. Finally, springs 208 and 218 are respectively provided urging the yoke arms 206 and 216 upwardly or in a clockwise direction as viewed in FIGS. 6 and 10. It will be understood that the yoke arms 206 and 216 are fixedly secured as by welding to the shaft 205 so that all the parts move in unison as the shaft 205 is turned.

Below the toweling support roll 210, there is provided a clean toweling bed or supply roll bed 220 which is comprised of a pair of side plates 221 mounted respectively on the inner surfaces of the side plates 171 and 172 and having disposed therebetween a rear wall 222, which parts cooperate to hold the supply roll 51 of clean toweling. Disposed above the supply roll bed 220 is a towel-divider cover 230 formed of plastic and supported by the shaft 205 and extending downwardly and forwardly to overlie the supply roll 51 of clean toweling and to prevent inadvertent contact thereof with the storage roll 59 of soiled toweling.

The supply roll 51 of clean toweling when installed in the dispensing cabinet 100, rests substantially in the position thereof illustrated in FIG. 6, the rear portion of the roll 51 lying longitudinally against the forward surface of the rear wall 222 of the toweling bed 220, with the opposite ends of the supply roll 51 disposed between the side plates 221. The forward side of the clean supply roll rests upon a guide roller 231 rotatably mounted between the side plates 171 and 172 immediately ahead of the toweling bed 220. As may be seen in FIG. 6, the clean toweling is fed from the bottom of the supply roll 51 upwardly and forwardly of the guide roller 231, then across and around the front side of the measuring roll 181.

Figure 3:
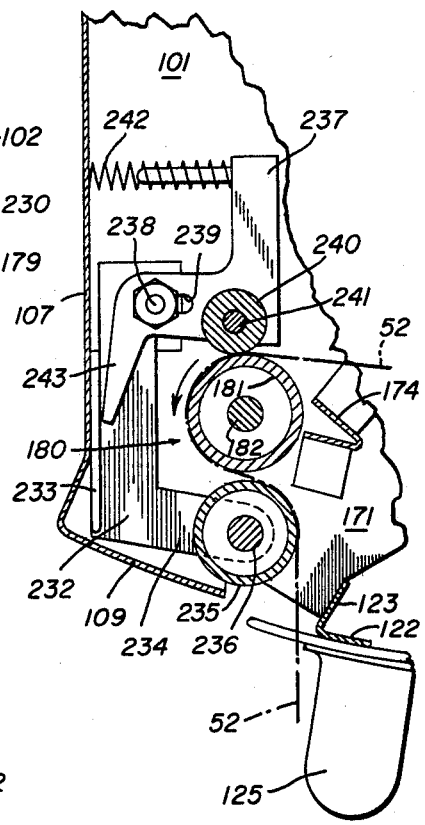
FIG. 3 is an enlarged, fragmentary, vertical sectional view taken through the lower portion of the front cover or wall of the cabinet to show the means for preventing slippage of the clean toweling with respect to the measuring roll.
Figure 2:
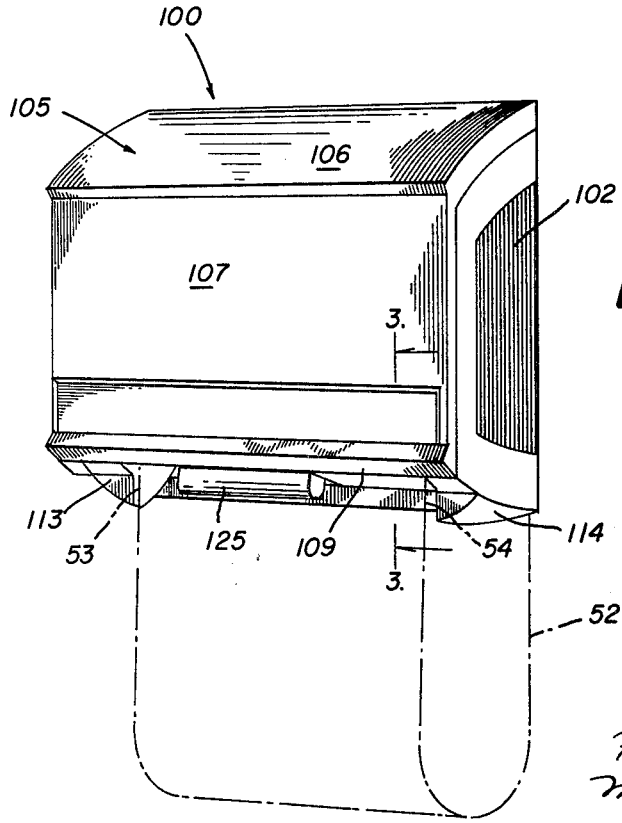
FIG. 2 is a perspective view of the toweling dispensing cabinet in its normal use condition, with a loop of toweling being represented in its use position by broken lines beneath the dispenser.

Referring to FIG. 3, there is illustrated a mechanism by which the reach 52 of clean toweling, as it moves about the measuring roll 181, is caused under all circumstances to be maintained in constant contact with the measuring roll 181 through approximately 180° of the friction surface of the measuring roll 181. There is provided a pair of brackets 232 mounted such as by welding on the inner surface of the front portion 107 of the cover 105 and in positions somewhat inwardly of the side plates 171 and 172, respectively. Each bracket 232 has a mounting flange 233 that is suitably secured as by welding on the cover portion 107 and has a rearwardly extending finger 234, the fingers 234 supporting therebetween a lower roll 235 mounted on a shaft 236 for free rotation immediately below the measuring roll 181 and disposed parallel thereto. Pivotally on the upper portion of each of the brackets 232 are respectively second brackets 237, the brackets 237 having slots 239 therein receiving stub shafts 238 therethrough whereby the brackets 237 are both shiftable and pivotal about the shafts 238. The brackets 237 carry therebetween a pressure roller 240 disposed above the measuring roll 181 and mounted for rotation upon a shaft 241 extending therethrough. The brackets 237 are pivoted in a clockwise direction and urged to the right as viewed in FIG. 3 under the urging of a spring 242 under compression, a finger 243 serving to limit the clockwise rotation of the associated bracket 237. The axis of the pressure roller 240 is parallel to the axis of the measuring roll 181 and the lower roll 235, the pressure roller 240 being spring-urged against the reach 52 of clean toweling by the action of the springs 242 when the cover 105 is in the closed position thereof.

It is desirable to limit the amount of clean toweling that the user can extract from the supply roll 51 by pulling downwardly upon the exposed reach 52, and thereafter to prevent further dispensing of clean toweling from the supply roll 51 until after the lapse of a predetermined time interval. To this end there has been provided in the dispensing cabinet 100 a time-stop mechanism generally designated by the numeral 250, the details of the time-stop 250 mechanism being best illustrated in FIGS. 4, 7, 8 and 9 of the drawings. The right-hand end of the measuring roll 181 has fixedly secured thereto a laterally protruding stop dog 251 and a cylindrical time-stop lead member 252 having threads 253 thereon. Outwardly of the beginning of the ends of the threads 253, the stop lead member 252 has formed thereon a cam 254 having a low cam surface 255 and a high cam surface 256.

Well above the axis of the stop lead member 252 and somewhat to the rear thereof, a time-stop pivot pin 257 is fixedly mounted on the side plate 172, the pivot pin 257 extending toward the right from the side plate 172 as shown in FIG. 8. The pivot pin 257 is further supported by a conical plate 258 that includes an annular support portion 259 engaging the pin 257 intermediate the ends thereof. Pivotally and loosely mounted on the outer end of the pin 257 is a stop latch 260 having riveted or otherwise fixedly secured a stop plate 261. It is important that the latch 260 and the attached plate 261 be able to rotate or pivot about the axis of the pin 257, and that they be capable of tilting or "wobbling" motion with respect to the axis of the pin 257. For this reason the stop latch 260 loosely mounted on the reduced portion of the pin 257 to permit such "wobbling" motion, the pin 257 being provided with an enlarged member 263 to hold the parts in the assembled position. As seen in FIG. 7, the stop plate 261 has an upstanding plate portion 266 carrying an inwardly directed pad 267, an interlock clip 268 tending to hold this portion of the stop latch 260 outwardly for a purpose to be described more fully hereinfter.

Extending downwardly and integral with the stop plate 261 is an arm 269 which carries thereon a soft rubber suction cup 270 having a lower generally concave side thereon. Facing the concave side of the suction cup 270 is a fixedly positioned suction cup 271 with its concave side facing the concave side of the suction cup 270. There is a small air opening (not shown) in the suction cup 271 which will permit suction annulling air to flow at a controlled rate into the concave area between the suction cups 270 and 271 after the suction cups have been pressed together. The suction cup 271 is mounted on a bracket 272 which is secured to the side plate 172. Also mounted on the bracket 272 is a needle valve assembly 274 including an adjusting thumb screw 273 by which the effective size of the air opening into the suction cup 271 may be changed, and thus to control the time delay required for the suction cups 270–271 to separate. The details of the suction cups 270 and 271 and the details of the needle valve 274 are not here shown, it being understood that these parts are well-known in the art and they are illustrated in prior patents including the above-mentioned patent to Birr.

The lower edge of the stop plate 261 carries therein a relatively short thread-following tab 276, and spaced above the tab 276 is a curved cam following surface 278 which cooperates with the cam 254 described above. There also is provided a tension spring 279 connected between the side plate 172 and the stop plate 261 to urge the stop plate 261 in a counterclockwise direction as viewed in FIG. 7. The tension spring 279 also tends to shift the stop plate 261 to the dashed line position illustrated in FIG. 8 and to the line illustrated in FIG. 9 in the end of each dispensing figure. Thus, by virtue of the action of the spring 279 and the pivotal or "wobbling action" permitted of the stop plate 261, the normal position of the stop plate 261 (shown in solid lines in FIG. 9 and in dotted lines in FIG. 8) is such that the cam-following surface 278 rides on the cam 254. When the dispensing mechanism is in its normal condition following the drying operation, the stop mechanism 250 is in the position described and shown in solid lines in FIG. 9 and in phantom lines in FIG. 8.

In this position the cam following surface 278 rests on the lower surface 255 of the cam 254 so that the stop plate 261 is pivoted to the counterclockwise position (as viewed in FIG. 7) with the suction cups 270 and 271 separated in the counterclockwise pivoted position, and the thread-following tab 276 is withdrawn from engagement with the threads 253 of the member 252. However, when the user of the dispenser starts to pull downwardly on the clean towel reach 52 at the front of the cabinet, the rotation of the measuring roll 181 causes the cam member 254 to rotate in the direction of the arrow shown in FIG. 7, thus causing the high surface 256 on the cam 254 to raise the cam following surface 278, thereby to pivot the stop plate 261 in a clockwise direction. This pivotal movement of the stop plate 261 immediately causes the suction cup 270 to be moved downwardly into pressed contact with the lower suction cup 271. The mated suction cups 270–271 thereupon retain the stop plate 261 in its pivotally displaced position, until the cups time-out, even though the high surface 256 of the cam 254 subsequently disengages the cam follower surface 278. This initial pivotal movement of the stop plate 261 also causes the thread-following tab 276 to engage the threads 253 and to be driven thereby for the solid line position in FIG. 9 to the dashed line position therein.

If it is desired that a maximum of 11 inches of clean toweling 52 may be dispensed upon each separate dispensing operation, the measuring roller 181 may be approximately 2¾ inches in circumference and four threads 253 may be employed on the stop lead member 252. Thus when the user begins to pull on the clean toweling reach 52, the cam 254 will rotate with the measuring roll 181, the high surface 256 of the cam 254 will pivotally pivot the stop plate 261 in the clockwise direction (as viewed in FIG. 7), thereby engaging the suction cups 270 and 271 and simultaneously engaging the thread-following tab 276 with the beginning or outermost thread 253. As the user continues to withdraw clean toweling, the measuring roll 181 and the stop reach member 252 will continue to be rotated, thereby to cause the thread-following tab 276 and the stop plate 261 to follow the threads 253, thus causing the stop plate 261 substantially to tilt from the position illustrated by solid lines in FIG. 9, the lower portion of the stop plate 261 being carried in a direction from the cam 254 toward the side plate 172. Since four threads 253 are used, as the measuring roll 181 completes its next revolution upon withdrawal of 10" of clean toweling, the tab 276 will have to be pulled to the fourth thread whereupon the stop dog 251, which has been rotated with the stop lead member 252 will come into stopping contact with the lower edge of the stop plate 261, thus halting the rotation of the measuring roll 181 and preventing the withdrawal of further clean toweling from the dispensing cabinet 100. The user may then dry his hands on the outdrawn toweling, and in normal operation, the suction cups 270–271 and the time out will separate thereupon permitting the spring 279 to pivot the stop plate 261 in the counterclockwise direction about the pin 257 and to tilt the stop latch away from the side plate 172, thereby causing the stop plate 261 to return to its original position.

By virtue of the construction just described, it will be appreciated if the user does not withdraw the fully permitted amount of clean toweling, but stops the withdrawal of toweling after withdrawal of a small length of clean toweling, the lower end of the stop plate 261 will not reach a position in which it will be engaged by the stop dog 251 and no stopping action will occur; nevertheless, when the suction cups 270 and 271 time out, the stop plate 261 will automatically be returned to its original position by the action of the spring 279, thereby permitting the maximum prescribed amount of toweling to be withdrawn during the next dispensing operation.

It is highly desirable that the retracting and storage 150 including the take-up arms 155 and the parts mounted thereupon be held in the elevated position after the user has withdrawn a length of clean toweling and while the user is drying his hands thereon, i.e., during the time that the suction cups 270 and 271 are timing out after having been engaged with one another. To this end the brake roller 135 is provided with a sandpaper or other such gripping surface and further is provided at the end thereof adjacent to the time-stop mechanism 250 with a control cam 280 having a pair of diametrically opposed stop surfaces 281, see FIG. 20. Associated with the control cam 280 and mounted on the side plate 130 is a control lever 282 pivoted as at 283 and having an upstanding finger 284 movable into and out of engagement with the stop surfaces 281 on the control cam 280. The other end of the lever 282 cooperates with a push rod 285 (see FIG. 7) that is controlled by the stop latch 261, and specifically the pad 267 thereon. The push rod 235 is journalled in a flange 286 struck from the side plate 172 and a second flange 287 disposed thereabove, the flanges 286 and 287 having aligned openings therein, through which the push rod 285 extends, the lower end of the push rod 285 carrying a head 289 engaging the interlock clip 268 and the pad 267. The upper end of the push rod is in a position to engage an abutment 288 on the end of the control lever 282 opposite the finger 284.

When the high cam surface 256 acts to pivot the stop plate 261 in a clockwise direction as viewed in FIG. 7, the push rod 285 is lowered to the position illustrated in FIG. 20, whereby the longer and heavier righthand end of the control lever 282 disposed to the right of the pivot 283 causes the finger 284 to be moved upwardly into position to engage one of the stop surfaces 281. It will be understood that during withdrawal of the toweling from the dispensing cabinet 100, the control cam 280 rotates in the direction of the arrow in FIG. 20, whereby the finger 284 does not stop rotation thereof. However, when the user stops withdrawing toweling from the dispensing cabinet 100 so that the take-up arms 155 would tend to drop, the control cam 280 will tend to rotate in the clockwise direction and thereby bring one of the stop surfaces 281 into abutting engagement with the finger 284, thereby to stop rotation of the brake roller 135. At the time that the suction cups 270–271 separate and thus permit the spring 279 to pivot the latch plate 261 in a counter-clockwise direction as illustrated in FIG. 7, the push rod 285 will be lifted and will pivot the control lever 282 in a counterclockwise direction, thereby to move the finger 284 out of engagement with the stop surfaces 281 and thereby to release the brake roller 135 and to permit the take-up arms 155 and the take-up rollers 160 and 165 carried thereby to fall to the normal start positions thereof.

There is incorporated in the dispensing cabinet 100 a novel loop control mechanism 300 which serves to maintain substantially constant the length of toweling in the several reaches 55 through 58 of soiled toweling and particularly the loop of toweling disposed below the cabinet 100 during use of the toweling, the loop control mechanism 300 being best illustrated in FIGS. 4, 5, and 10 to 16. There is provided a shield 301 disposed adjacent to the take-up drive roll 191 and extending therealong for substantially the entire length thereof, the shield 301 being provided at the ends thereof with side walls 302 having openings receiving therein bearings 306 that provide for pivotal movement thereof about the same axis as the drive roll 191, the bearings 306 being supported upon the reduced end portions 192 and 193 of the take-up drive roll 191. Each of the side walls 302 is provided with an arm 303 which carries on the outer end thereof a rubber bumper 304. The side wall 302 disposed adjacent to the sprocket 195 also carries thereon a cam surface 305 which will be described in greater detail hereinafter. Finally there is provided a spring 307 under tension interconnecting the side wall 302 adjacent to the sprocket 195 with the side plate 171, the spring 307 being under tension and urging the parts including the shield 301 in a clockwise direction around the axis of the shaft 194 as viewed in FIG. 10.

Associated with the loop control mechanism 300 is an anti-milking device 310 which serves to prevent both the withdrawal of soiled toweling from the storage roll 51 at the end of a dispensing operation and also prevents dispensing of clean toweling across the dispensing roll 181 unless the parts of the take-up mechanism 190 including the loop control mechanism 300 are in the normal position to take up soiled toweling as required. The anti-milking device 310 more specifically includes a pin 311 mounted on the sprocket 195 and extending inwardly therefrom as viewed in FIG. 19. Mounted adjacent to the sprocket 195, and more specifically on the side plate 171, is a lever 312 that cooperates with the cam surface 305 on the adjacent shield side wall 302, the lever 312 being connected through a shaft 313 having square portions of the ends thereof to a stop arm 314, the stop arm 314 being pivotal into and out of engagement with the pin 311 under the control of the lever 312.

The following is a description of the use and operation of the dispensing cabinet 100, with particular emphasis on the operation of the loop control mechanism 300 and the anti-milking device 310, special reference being made to the diagrammatic views of FIGS. 11 to 16 and 21 to 23. The normal rest position of the parts of the cabinet 100 preparatory to a dispensing operation are diagrammatically illustrated in FIG. 11, the supply roll 51 of clean toweling having the reach 52 therefrom passing over the measuring roll 181 and across the spacing member 125 and then through the channel 115 and the opening 120 and upwardly via the reach 56 over the brake roller 135 and downwardly via the reach 57 under the take-up roller 160 and upwardly over the loop roller 145 and via the reach 58 downwardly around the take-up roller 165 and thus to the bottom of the storage roll 59 for soiled toweling. At this time the take-up arms 155 are approximately midway between the uppermost position thereof and the lowermost position thereof, and the weight of the take-up arms 155 and the parts mounted thereon is serving to hold the several reaches of the toweling in a taut condition as illustrated. All soiled toweling is hidden from the normal view of the potential user, so that the user, when he begins a dispensing operation, will have no tendency to grab a soiled toweling portion. The time-stop mechanism 250 will be in the condition illustrated in FIG. 11 with the suction cups 270 and 271 out of engagement with each other. The push rod 285 will be in its normal or lower position thereby releasing the control lever 282 so that the parts assume the positions illustrated in FIG. 20.

With the mechanism in the normal condition just explained, the next user of the dispensing cabinet 100 grips the unused side edges 53 and 54 of the reach 52 of clean toweling adjacent to the spacing member 125, and pulls downwardly thereon. This downward pull, accomplishes two basic things. It feeds fresh toweling from the supply roll 51 around the measuring roll 181 and downwardly across the spacing member 125, and also pulls on the reaches 55–58 of soiled toweling thereby pulling from within the dispensing cabinet 100 through the opening 120 a length of soiled toweling which elongates the loop of toweling below the dispensing cabinet 100, the parts now being essentially in the position illustrated in FIG. 12. The withdrawal of soiled toweling from the cabinet while the take-up mechanism 190 is operating is accomplished by shortening the reach 57 and adding a portion of the toweling thereof to the loop of toweling below the cabinet 100. The downward pull on the clean toweling also immediately sets in motion the operation of the time-stop mechanism 250, the details of operation of which have been set forth hereinabove and which also are set forth in the aforementioned Bahnsen Patent No. 3,323,848, the disclosure of which is incorporated herein by reference. Fundamentally, the suction cups 270 and 271 are urged together and are held together for the predetermined time interval during which time the user will dry his hands on the reach 52 of clean toweling now disposed beneath the cabinet 100. It is noted that although the weight of the arms 155 and the parts mounted thereon will tend to withdraw the soiled toweling into the rear of the cabinet 100, the brake roller 135 now has the control cam 280 thereof in engagement with the control lever 282, i.e., one of the stop surafces 281 is in engagement with the finger 284 (see FIG. 20), whereby retrograde rotation of the brake roller 135 is prevented. As a consequence the brake roller 135 serves to hold the take-up arms 155 and all of the parts carried thereby in the elevated positions of FIG. 12, all without imposing any pull upon the reach 56 of soiled toweling dependent rearwardly and downwardly from the brake roller 135.

During the withdrawal of fresh toweling by the user from the supply roll 51 over the measuring roll 181, the take-up drive roll 191 is also driven through the action of the sprockets 185 and 195 and the chain 201 which comprise the drive mechanism 300. In accordance with the present invention, the take-up drive roll 191 has a diameter of 1 inch, whereas the measuring roll 181 has a diameter of ⅞ inch, and since the sprockets 185 and 195 have the same number of teeth and the same effective diameters, the take-up drive roll 191 tends to take up approximately 1½ inches more soiled toweling than the measuring roll 181 dispenses of clean toweling, if the measuring roll 181 dispenses the full 11 inches of clean toweling permissible. However, the taking up of the soiled toweling by the take-up drive roll 191 combined with the downward pull of the user on the reach 56 lifts the arms 155 and the take-up rollers 160 and 165 mounted thereon to the elevated position of FIG. 12 prior to the completion of the withdrawal of clean toweling across the measuring roll 181. In the positions of parts in FIG. 12, the take-up roller 165 is in position to contact the bumpers 304 caried by the shield 301, whereby the shield 301 is pivoted from the position illustrated in FIG. 11 to that illustrated in FIG. 12. With the shield 301 in the position illustrated in FIG. 12, the shield 301 is disposed between the surface of the take-up drive roll 191 and the surface of the storage roll 59 of soiled toweling, thereby positively to prevent any driving connection therebetween, and thus to interrupt and stop the taking up of soiled toweling into the storage roll 59. The parts are constructed and arranged so that in the normal operation of the dispensing cabinet 100, the shield 301 is moved into the position of FIG. 12 to stop the operation of the take-up mechanism 190 at a time such that the amount of soiled toweling taken up on the storage roll 59 by the take-up mechanism 190 equals the length of fresh toweling dispensed by the dispensing mechanism 180. It will be appreciated that since the take-up mechanism 190 takes up soiled toweling at a greater rate than the dispensing mechanism 180 dispenses clean toweling, operation of the take-up mechanism 190 may be interrupted prior to completion of the operation of the dispensing mechanism 180 and still take up a length of soiled toweling equal to the length of fresh toweling dispensed. As a result the length of toweling in the exposed loop beneath the cabinet 100 may be maintained substantially constant.

When the timer suction cups 270–271 separate, the spring 279 pivots the stop plate 261 in the counterclockwise direction which serves to operate the push rod 285 into engagement with the abutment 288 on the control lever 282 (see FIG. 20), thereby to remove the finger 284 out of engagement with the cam surface 281, this action releasing the brake roller 135 which permits the parts to fall from the position illustrated in FIG. 12 through the position illustrated in FIG. 13 and to the positions illustrated in FIG. 11. It will be appreciated that the provision of the links 151 and the particular arrangement thereof including the flange 153 engaging the surface 164 on the associated take-up arm 155 causes the take-up rollers 160 and 165 to describe essentially vertical paths during the movement of the parts as described above.

If there is initially too much toweling in the loop of toweling below the cabinet 100, the take-up arms 155 and the take-up rollers 160–165 will not be lifted to a position so that the roller 165 engages the bumpers 304 until late in the dispensing cycle, and in fact, in the event that there is an unusually large excess of toweling in the loop beneath the cabinet 100, the take-up roller 165 may never contact the bumpers 304, whereby as much as 1½ inches of soiled toweling may be taken up by the take-up mechanism 190 in excess of the length of clean toweling disposed by the dispensing mechanism 180. Accordingly, over a number of cycles of operation, even a large excess of toweling in the loop beneath the cabinet 100 may be taken up and placed on the storage roll by the loop control mechanism 300.

On the other hand, if there is too little toweling in the loop beneath the cabinet 100, then the take-up arms 155 and the take-up rollers 160 and 165 will be lifted very quickly, whereby to cause the take-up roller 165 quickly to engage the bumpers 304, whereby to shift the shield 301 into the position of FIG. 12 very early in the dispensing cycle of the dispensing mechanism 180. As a result, very little soiled toweling is taken up by the take-up mechanism 190 while the normal amount of clean toweling is dispensed by the dispensing mechanism 180, and as a consequence the amount of toweling in the loop beneath the cabinet 100 will be gradually increased during each dispensing cycle until the normal desired length of toweling is present in the loop beneath the cabinet 100.

Recapitulating, in the operation of the loop control mechanism 300 during normal dispensing operations of the dispensing cabinet 100, the drive mechanism 200 and the loop control mechanism 300 cooperate to maintain a predetermined length of toweling in the toweling loop below the cabinet 100 in response to the length of toweling in the toweling loop. More specifically, the take-up mechansim 190 normally operates to take up more toweling than is dispensed by the dispensing mechanism 180, the drive for the take-up mechanism 190 being effectively interrupted by means of the shield 301 at some point during or at the end of a dispensing operation. If the length of toweling in the toweling loop at the exposed use position accessible to a user is of the proper predetermined length, then the loop control mechanism 300 responding to the proper length of toweling in the loop interrupts the operation of the drive mechanism for the take-up mechanism 190 by means of the shield 301 to cause the take-up mechanism 190 to stop taking up toweling after the taking up of a length of toweling equal to that dispensed. On the other hand, if the length of toweling in the toweling loop is greater than the predetermined length, than the shield 301 is moved into position to interrupt the drive for the take-up mechanism 190 very late in the operation of the dispensing mechanism 180, and perhaps not at all, whereby to take up a longer length of toweling than that dispensed. However, if the length of toweling in the loop is less than the predetermined length, then the shield 301 is moved into position to interrupt the drive for the take-up mechanism 190 early in the operation of the dispensing mechanism 180 whereby to take up a shorter length of toweling than that dispensed. A control mechanism is provided fundamentally comprising the take-up roller 165 and the bumpers 304, the operation of the control mechanism being directly caused by and responsive to the length of the toweling in the soiled toweling loop, and more precisely is related to the tension in the soiled toweling loop, a shorter length resulting in an earlier tension which raises the take-up roller 165 into contact with the bumpers 304 more quickly or earlier in the dispensing operation, a longer length resulting in a later tension which raises the take-up roller 165 into contact with the bumpers 304 more slowly or later in the dispensing operation.

The rubber bumpers 304 in cooperation with the take-up roller 165, which may be formed of polyethylene plastic or other materials, provide one form of anti-milking device that prevents withdrawal of soiled toweling from the storage roll 59 by simply pulling downwardly on the toweling reach 56 either at the beginning of or at the end of a dispensing operation. Referring specifically to FIGS. 14 to 16, there is shown in FIGS. 14 and 15 thereof the details of the operation of the parts at the time of contact between the take-up roller 165 and the bumpers 304 during normal dispensing. More specifically, it will be noted that the toweling reach 58 is being drawn downwardly and to the left due to the rotation of the storage roll 59 under the driving action of the take-up drive roll 191. The toweling in the reach 58 in contact with the plastic surface of the roller 165 tends to rotate the roller 165 in a clockwise direction at the time of contact with the bumpers 304. As the result of the clockwise rotation of the roller 165 at the time of contact with the bumpers 304, the take-up roller 165 tends to "walk under" the rubber bumpers 304, thus to raise the rubber bumpers 304 to the position illustrated in FIG. 15 and thus to pivot the shield 301 to the shielding position illustrated in FIG. 15 so as to break or interrupt the driving connection between the take-up drive roll 191 and the storage roll 59 as illustrated in FIG. 14 by placing the parts in the positions of FIG. 15. As a consequence, if the user grips the toweling and carries out a normal toweling dispensing operation, the take-up roller 165 acts to lift the bumpers 304 and to place the shield 301 in the position of FIG. 15 thus to interrupt operation of the take-up mechanism 190.

On the other hand, if the user attempts to withdraw toweling from the storage roll 59 by pulling downwardly on the reach 56 without also operating the dispensing mechanism 180, then the take-up roller 165 will either be non-rotating or will be rotating in a counterclockwise direction at the time of engagement with the rubber bumpers 304. As a result, the take-up roller 165 tends to "walk out" from under the bumpers 304 and as a result the take-up roller 165 moves over and above the bumpers 304 to the position illustrated in FIG. 16, and as a consequence, the shield 301 is immediately returned to the retracted position thus to place the surface of the storage roll 59 in contact with the sandpaper surface on the take-up drive roll 191. Inasmuch as the user is not operating the dispensing mechanism 180, the take-up drive roll 191 will be held stationary by the drive mechanism 200 and thus the user will not be able to withdraw soiled toweling from the storage roll 59 by simply pulling downwardly on the reach 56.

The above noted cooperation between the take-up roller 165 and the bumpers 304 is also useful when it is desired to open the cover 105, such for example as when changing the toweling 50 within the dispensing cabinet 100. Referring to FIG. 10, it will be seen that lifting the cover 105 to the raised position thereof causes the cables 161 to lift the take-up arms 155 and the take-up rollers 160 and 165 carried thereby. Since the take-up roller 165 will not be driven in a clockwise direction during the opening of the cover 105, it will "walk out" from under and around the bumpers 304 and thus the parts can rise smoothly to the positions illustrated in FIG. 10. It will be noted that the arms 126 serve to hold the cover 105 in the raised position and also that the notches 158 in the fingers 156 will engage the loop roller 145 so as to hold the arms 155 and the parts mounted thereon in the upper portions illustrated. The opening of the cover 105 also causes the brackets 128 to engage the brake roller 135 and to move it from the slot position 138 to the upper end of the slot 137 so as to facilitate threading of new toweling therearound. In passing it is pointed out that a loading guide 315 is mounted on the arms 155 and is disposed so as to discourage the user from inserting the toweling between the rollers 135 and 145, rather than behind and over the roller 135 and over the roller 145 as required.

In the event that the pull on the clean toweling by the user exhausts the supply of toweling in the supply roll 51, the free end of the toweling is pulled from the front of the cabinet 100 and dangles downwardly from the cabinet 100 in a use position during the timed period referred to above. Upon the expiration of the timed period and in that event, all of the parts of the dispenser mechanism return to their normal positions as previously explained except that the take-up arms 155 and the parts carried thereby fall downwardly to the bottom of the cabinet 100, which action serves to pull the entirety of the dangling free end of the toweling into the cabinet, all as is fully explained in the aforementioned Bahnsen Patent No. 3,323,848.

A special problem is encountered if the amount of toweling remaining on the supply roll 51 is less than that required to cause at least one complete revolution of the measuring roll 181. More specifically, the cam 254 is in engagement with the cam follower surface 278 on the stop plate 261 during the first revolution of the measuring roll 181 and holds the stop plate 261 in a position so that it cannot return to the normal condition illustrated in FIG. 7. The time-stop mechanism 250 therefore would serve to operate to stop the brake roller 135 by operation of the push rod 285, the cam 280 and the lever arm 282 (see FIG. 20 also). As a consequence, the take-up arms 155 and the take-up rollers 160 and 165 mounted thereon would be held in the elevated position and could not retract the unsightly trailing end of the toweling into the cabinet as described above. Accordingly, there has been provided the interlock clip 268 which serves to hold the push rod 285 upwardly to cause disengagement of the brake roller 135 during the first revolution of the measuring roll 181. After completion of the first revolution of the first measuring roll 181, the cam 254 is out of engagement with the cam follower surface 278, whereby the time stop mechanism 250 can now operate in the usual normal manner to operate the brake roller. In other words, the interlock clip 268 ensures that the take-up arms 155 are free to operate to take up the trailing end of toweling into the cabinet 100 if the length thereof is insufficient to permit the cam 254 to clear the cam follower surface 278.

After exhaustion of the clean toweling on the supply roll 51, a maintenance man opens the cabinet 100 by raising the cover 105 to the position illustrated in FIG. 10 after operation of the lock 124. The storage roll 59 of the soiled toweling is then removed from the take-up roll 210 and the take-up roll 210 replaced in the bearings 211. A fresh supply roll 51 is then placed in the bed 220 in the manner indicated and the free end thereof pulled from thereunder and over the guide roller 231 and over the measuring roll 181 and downwardly around the spacing member 125 and upwardly past the panel 117 which will bend upwardly. The free end of the fresh toweling is then passed behind the brake roller 135 which action is facilitated by the fact that the brake roller 135 is held in the forward elevated position by the brackets 128. The free end of the toweling is then passed over the loop roller 145 which action is assured by the provision of the loading guide 315 that blocks any efforts to pass the toweling between the rollers 135 and 145. Next, the free end of the toweling is wrapped about the surface of the towel take-up roll 210, care being taken to assure that the divider cover 230 is in the proper operative position.

Referring now to FIGS. 17 to 23 of the drawings, the operation of the anti-milking device 310 will be described in detail. The purpose of the anti-milking device 310 is to prevent both the continued withdrawal or milking of soiled toweling from the storage roll 59 at the end of a dispensing operation, i.e. while the shield 301 is in the position of FIGS. 12 and 15, and also to prevent the withdrawal of clean toweling (after waiting out each time-stop interval) while pulling down on the soiled toweling such as in the reach 56 in an effort to prevent take-up thereof, again the shield 301 being in the position of FIGS. 12 and 15.

In the normal operation of the dispensing cabinet 100, the parts are in the positions illustrated in FIG. 21 at the beginning of a dispensing operation. Since this is a normal dispensing operation, the take-up roller 165 will be rotating in a clockwise direction and will therefore "walk under" the bumpers 304 thus to pivot the shield 301 and its side wall 302 to the position illustrated in FIG. 22. Such movement of the shield 301 will cause the cam surface 305 to engage and pivot the lever 312 in a clockwise direction from the position illustrated in FIG. 21 to that illustrated in FIG. 22. As a result, the stop arm 314 is pivoted in a clockwise direction to the position illustrated in FIGS. 22 and 23, whereby after continued rotation of the sprocket 195 as driven by the chain 201, the pin 311 carried by the sprocket 195 will come into contact with the adjacent end of the stop arm 314.

As a consequence of the engagement of the pin 311 with the stop arm 314, the sprocket 195 is positively stopped as is the take-up drive roll 191 attached thereto, and due to the interconnection between the sprockets 185 and 195 by the chain 201, the measuring roll 181 is also positively stopped. As a result, there can be no further dispensing of clean toweling until the user releases the loop of toweling beneath the cabinet 100 so as to permit the take-up roller 165 to fall to the normal position illustrated in FIG. 11, thus to permit the bumper 304, the cam 305, the lever 312 and the stop arm 314 to return to the original positions illustrated in FIG. 21. It will be appreciated, therefore, that there can be at most slightly less than one revolution of the sprocket 195 and the attached take-up drive roll 191 after movement of the take-up roller 165 to the elevated position illustrated in FIGS. 22 and 23.

With the parts in the position illustrated in FIG. 23, it is impossible to withdraw additional clean toweling from the supply roll 51 since movement of the measuring roll 181 is stopped via the sprocket 185 and the chain 201 and the sprocket 195, the sprocket 195 being held immobile by engagement between the pin 311 and the stop arm 314.

In the event that the user tries to withdraw clean toweling by operation of the dispensing mechanism 180 while preventing the take-up of soiled toweling by the take-up mechanism 190 after a normal dispensing operation, then the anti-milking device 310 will thwart such activity. More specifically, so long as the soiled toweling in the reach 56 is held in a tensioned condition, the take-up roller 165 will be in engagement with the bumpers 304 as in FIG. 23. As a result, it will be impossible to dispense clean toweling from the supply roll 51 via the dispensing mechanism 180, since the measuring roll 181 is blocked via the sprocket 185, the chain 201, the sprocket 195, the pin 311 and the stop arm 314. As has been explained above in describing the first embodiment of the invention illustrated in FIGS. 1 to 23 of the drawings, the fundamental mode of operation requires that the take-up mechanism 190 take up soiled toweling at a faster rate than the dispensing mechanism 180 dispenses clean toweling, and at a predetermined point as determined by the amount of the toweling in the several reaches supporting the take-up rollers 160 and 165, the operation of the take-up mechanism is interrupted so as to provide means to control the amount of soiled toweling takeup, and thus to control the length of the loop of exposed toweling beneath the dispensing cabinet 100.

There is illustrated in FIGS. 24 to 33 of the drawings a modified form of the invention designated by the numeral 400 wherein a one-revolution clutch is provided in place of the shield 301, the one-revolution clutch being operated by the take up roller 165 in accordance with the amount of toweling in the loop beneath the dispensing cabinet 400. It will be understood that many of the parts in the dispensing cabinet 400 of FIGS. 24 to 33 are identical with the parts in the first form of the invention as embodied in the dispensing cabinet 100 and as illustrated in FIGS. 1 to 23 of the drawings, and accordingly, like numerals have been applied to like parts where appropriate. Furthermore, the basic construction of the dispensing cabinet 400 illustrated in FIGS. 24 to 33 is identical to that described above with respect to the dispensing cabinet 100, whereby only the changes in construction in the dispensing cabinet 400 will be described in detail herein.

The fundamental difference between the dispensing cabinets 100 and 400 resides in the construction and operation of the soiled toweling take-up mechanism thereof, the dispensing cabinet 400 being provided with the novel take-up mechanism 410, the details of which are best illustrated in FIGS. 26 to 29 of the drawings. The take-up mechanism 410 includes a take-up drive roll 411 which has a sandpaper or other granular surface thereon to minimize slipping of the toweling thereacross. The take-up drive roll 411 is formed hollow (see FIG. 28) and includes a shorter reduced end 412 disposed to the left and extending through a flanged opening in the side plate 172 and supported therein on a bearing 416 which may be formed of a suitable lubric plastic. The other end of the drive roll 411 has a longer reduced end 413 that extends through a flanged opening in the side plate 171 and is supported therein in a suitable bearing 417 also formed of a lubric plastic. Extending through the hollow drive roll 411 is a shaft 414 carrying on one end thereof a one-revolution clutch 430, the adjacent end of the shaft 414 having a head 422 thereon. An annular end plate 423 closes the other end of the drive roll 411 and is held in position thereon by a nut 424 engaging a threaded portion of the shaft 414.

The one-revolution clutch 430 includes a cup 431, a toothed sprocket 435, a plate 440 and an actuator 450 suitably assembled, these parts being shown in an exploded view in FIG. 29. The cup 431 has a square opening 432 therein centrally thereof which receives a square section 425 on the adjacent end of the shaft 414, and extending from the free edge of the cup 431 is an outer flange 433. Formed in the flange 433 are two diametrically opposed arcuate slots 434, the slots 434 being shaped and arranged to receive two arcuate projections 418 formed on the adjacent end of the reduced end 413 of the take-up drive roll 411. Disposed adjacent to the cup 431 in the clutch 430 is a toothed sprocket 435 having a circular opening 436 centrally thereof, the opening 436 being provided with a cutaway portion as at 437 to form an engagement surface 438 extending radially outwardly from the surface of the opening 436. Adjacent to the sprocket 435 is mounted the plate 440 that includes centrally thereof a cylindrical portion 441 that extends through the opening 436 in the sprocket 435 and into the cup 431 for nesting relationship therewith, the portion 441 having a square opening 442 therein that also receives the square section 425 on the shaft 414. Formed in the side of the cylindrical portion 441 is an arcuate slot 443 which is in longitudinal alignment with the opening 436 and 437 in the sprocket 435, see FIG. 28. There also is provided an outer flange 444 on the plate 440, the flange 444 having a threaded opening 445 thereon.

Mounted adjacent to the plate 440 and surrounding the plate 440 is the actuator 450, the actuator 450 including a substantially flat plate 451 which carries on the outer periphery thereof an annular flange 452 that surrounds the plate 440. An offset portion 453 is provided in the plate 440 and has an opening therein receiving a screw 454 that engages in the threaded opening 445 on the plate 440, thereby to mount the actuator 450 for pivotal movement with respect thereto and upon the plate 440. Centrally of the plate 451 a portion thereof is cut away to provide a hook 455 that is offset axially and in the assembled condition of the parts is in longitudinal alignment with the slot 443 in the plate 440 and extends therethrough and into longitudinal alignment with the openings 436 and 437 in the sprocket 435. The hook 455 has an abutment surface 456 that is adapted to engage the surface 438 on the sprocket 435 and has a bearing surface 457 thereon that is adapted to engage the surface defining the opening 436 and 437 in the sprocket 435. Finally, there is provided a spring 458 under tension interconnecting the actuator 450 and the plate 440 and tending to urge the actuator 450 in a counterclockwise direction about the screw 454 as illustrated in FIG. 26.

Referring to FIG. 28, it will be seen that in the assembled condition of the parts of the one-revolution clutch 430, the cylindrical portion 441 nests in the cup 431 with the square openings 442 and 432 respectively in alignment and receiving the square section 425 of the shaft 414 therethrough, whereby the cup 431 and the plate 440 rotate with the shaft 414. The sprocket 435 is journalled on the cylindrical portion 441 of the plate 440 and is free to rotate with respect thereto in the absence of the hook 455. The actuator 450 is pivoted on the plate 440 by means of the screw 454 with the hook 455 extending through the arcuate slot 443 and into the opening 436 and 437 in the sprocket 435. The spring 458 interconnects the plate 440 and the actuator 450. Finally, and with particular reference to FIGS. 30 and 33 of the drawings, it is pointed out that the flange 452 on the actuator 450 is in position to be contacted by the take-up roller 165 when the roller 165 is raised to the uppermost position thereof during a toweling dispensing operation.

The operation of the one-revolution clutch 410 and the manner in which it serves to control and maintain constant the length of toweling in the loop below the cabinet 400 will now be described in detail with particular reference to the diagrammatic views in FIGS. 30 to 33. At the beginning of a normal dispensing operation, the parts are in the position illustrated in FIG. 30, i.e., the spring 458 holds the actuator 450 urging it in counterclockwise direction about the screw 454, thereby to urge the hook 455 into engagement with the sprocket 435, the abutment surface 456 being more specifically in contact with the engagement surface 438. A chain 421 interconnects the sprocket 185 forming a part of the dispensing mechanism 180 and the sprocket 435, the sprockets 185 and 435 having the same effective radius and the same number of teeth. However, the measuring roll 181 in a typical example has a diameter of ⅞ inch while the take-up drive roll 411 has a diameter of 1 inch, whereby 1½ inches more of soiled toweling are taken up by the take-up drive roll 411 for each complete dispensing operation of the measuring roll 181, all as has been described hereinabove with respect to the cabinet 100. As a result, the sprocket 435 will be driven in the direction of the arrow thereon in FIG. 30 and due to the engagement with the hook 455 will also drive the actuator 450 and the plate 440 and the cup 431 and the take-up drive roll 411 connected thereto in the same direction, i.e., in the direction of the arrow on the actuator 450 in FIG. 30.

At the same time that the user is pulling on the clean toweling reach 52 to cause the operation of the dispensing mechanism 180 thereby to cause the above-described operation of the sprocket 435 and the take-up drive roll 411, the user is pulling downwardly on the rear reaches of the soiled toweling within the cabinet 400, thus to cause the take-up arms 155 and the take-up rollers 160 and 165 carried thereby to be raised toward and eventually into engagement with the actuator 450 as in FIG. 31. If the pivot screw 454 is within the 120° arc defined by the radii 448 and 449 in FIG. 31 when the take-up roller 165 reaches the position illustrated therein, the actuator 450 will be pivoted in a clockwise direction about the pivot screw 454 and against the action of the spring 458 from the dashed line position in FIG. 31 to the solid line position therein. As a consequence, the hook 455 will be moved out of engagement with the sprocket 435 and thus to render the sprocket 435 free running upon the cylindrical portion 441 and thus effectively disconnected from driving engagement with the take-up drive roll 411. Therefore take up of soiled toweling onto the storage roll 457 will be stopped, even though the dispensing mechanism 180 continues to operate to drive the sprocket 435 via the drive chain 421.

As the parts continue to rotate in a clockwise direction from the position illustrated in FIG. 31 to that illustrated in FIG. 32, it will be noted that the hook 455 will be in engagement with the surface forming the opening 436, and more specifically the bearing surface 457 will rest thereagainst and the parts will continue in this condition from the position illustrated in FIG. 31 through the position illustrated in FIG. 32 and into the position illustrated in FIG. 33 even though the take-up roller 165 is moved out of engagement with the actuator 450, it being appreciated that the tension spring 458 holds and urges the hook 455 into engagement with the surface defining opening 436 in the sprocket 435. For one full revolution between the sprocket 435 and the actuator 450, the parts will be disconnected one from the other but shortly after the position illustrated in FIG. 33, the hook 455 will again engage the sprocket 435.

Recapitulating the operation of the one-revolution clutch 430, the clutch parts are in the engaged position, i.e., the hook 455 engages the sprocket 435, at the beginning of a dispensing operation and the clutch parts will be in the disengaged positions when the take-up roller 165 is in engagement with the actuator 450 as illustrated in FIG. 31, and for substantially one-revolution of the sprocket 435 thereafter. As a consequence, the take-up mechanism 410 normally operates to take up more toweling than is dispensed by the dispensing mechanism 180, the drive for the take-up mechanism 410 being effectively interrupted by operation of the one-revolution clutch 430 some time during or at the end of a dispensing operation. If the length of toweling in the toweling loop at the exposed use position accessible to the user is of the proper predetermined length, then the one-revolution clutch 430 under the action of the take-up roller 165 responding to the proper length of toweling in the loop actuates the clutch 430 to the release position and interrupts the operation of the take-up mechanism 410 to stop taking up toweling after a length of toweling has been taken up equal to that which has been dispensed. On the other hand, if the length of toweling in the toweling loop is greater than the predetermined length, then the clutch 430 is operated to interrupt the drive for the take-up mechanism 410 very late in the operation of the dispensing mechanism 180, and perhaps not at all, whereby to take up a length of toweling that is longer than that dispensed. However, if the length of toweling in the loop is less than the predetermined length, then the clutch 430 is operated to interrupt the drive for the take-up mechanism 410 very early in the operation of the dispensing mechanism 180, whereby to take up a length of toweling shorter than the length of toweling dispensed. A control mechanism fundamentally comprising the take-up roller 165 and the actuator 450 control the operation of the clutch 430, the control mechanism being directly responsive to the length of the toweling in the soiled toweling loop, and more precisely is related to the tension in the soiled toweling loop, a shorter length resulting in a greater tension which raises the take-up roller 165 into contact with the actuator 450 more quickly or earlier during the operation of the dispensing mechanism 180 into contact with the actuator 450, a longer length resulting in a lesser tension which raises the take-up roller 165 into contact with the actuator 450 more slowly or later during the operation of the dispensing mechanism 180.

From the above it will be seen that there have been provided improved toweling dispensers with loop control mechanisms and anti-milking devices which fulfill all of the objects and advantages set forth above.

Although there have been described what are at present considered to be the preferred embodiment of the invention, it will be understood that various modifications may be made therein.

What is claimed is:

1. In a toweling dispenser of the continuous type having a housing with a loop of toweling that extends along an exit path from a clean toweling supply within the housing and into an exposed use position exteriorly of the housing accessible to a user and thence along a return path to a soiled toweling storage position within the housing, the combination comprising: dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing for taking up soiled toweling from the toweling loop along the return path and into the soiled toweling storage position within the housing; and drive mechanism interconnecting said dispensing mechanism and said take-up mechanism and responsive to the length of toweling in the toweling loop to maintain a predetermined length of toweling in the toweling loop, said drive mechanism causing said take-up mechanism to take up more toweling than is dispensed by said dispensing mechanism when the length of toweling in the toweling loop is greater than the predetermined length and to take up less toweling than is dispensed by said dispensing mechanism when the length of toweling in the toweling loop is less than the predetermined length, whereby to maintain substantially constant at the predetermined length the length of toweling in the toweling loop at the exposed use position accessible to a user.

2. The combination in a towel dispenser as set forth in claim 1, wherein said dispensing mechanism includes a measuring roll having a friction surface thereon for dispensing clean toweling from the clean toweling supply into the toweling loop.

3. The combination in a towel dispenser as set forth in claim 1, wherein said dispensing mechanism includes a measuring roll having a friction surface thereon and rollers resiliently urging the toweling against said frictional surface around at least about 180° of the circumference thereof.

4. The combination in a towel dispenser as set forth in claim 1, wherein said take-up mechanism includes a take-up drive roller having a frictional surface thereon engaging a storage roll of toweling at the soiled toweling storage position.

5. The combination in a towel dispenser as set forth in claim 1, wherein said dispensing mechanism includes a measuring roll having a frictional surface thereon for feeding clean toweling from the supply thereof into the toweling loop, and said drive mechanism includes a take-up drive roll driven by said measuring roll for taking up soiled toweling into the soiled toweling storage position, said measuring roll and said take-up drive roll having the same angular velocity and said take-up drive roll having a greater diameter of frictional surface than said measuring roll thereby to take up more toweling than is dispensed.

6. In a toweling dispenser of the continuous type having a housing with a loop of toweling that extends along an exit path from a clean toweling supply within the housing and into an exposed use position exteriorly of the housing accessible to a user and thence along a return path to a soiled toweling storage position within the housing, the combination comprising: dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing for taking up soiled toweling from the toweling loop along the return path and into the soiled toweling storage position within the housing; drive mechanism interconnecting said dispensing mechanism and said take-up mechanism for causing said take-up mechanism to take up soiled toweling at a rate greater than that at which clean toweling is dispensed by said dispensing mechanism, and control mechanism responsive to the length of toweling in the toweling loop for rendering said take-up mechanism temporarily ineffective to take up soiled toweling to maintain a predetermined length of toweling in the toweling loop, said control mechanism rendering said take-up mechanism ineffective after taking up a length of toweling equal to that dispensed when the length of toweling in the toweling loop is substantially equal to the predetermined length, said control mechanism rendering said take-up mechanism ineffective relatively early during the dispensing of toweling by said dispensing mechanism when the length of toweling in the toweling loop is less than the predetermined length thereby to take up less toweling than is dispensed and thus to lengthen the toweling loop, said control mechanism rendering said take-up mechanism ineffective relatively late during the dispensing of toweling by said dispensing mechanism when the length of toweling in the toweling loop is greater than the predetermined length thereby to take up more toweling than is dispensed and thus to shorten the toweling loop, whereby to maintain substantially constant at the predetermined length the length of toweling in the toweling loop at the exposed use position accessible to a user.

7. The combination in a toweling dispenser of the type set forth in claim 6, and further comprising time delay mechanism stopping said dispensing mechanism and said take-up mechanism after the dispensing of a predetermined length of clean toweling and holding said mechanisms in the stopped condition for a predetermined period of time.

8. The combination in a toweling dispenser of the type set forth in claim 6, and further comprising loop retraction and storage mechanism within the housing including a pair of spaced supports having a portion of the toweling suspended thereacross and a weight resting upon the suspended portion of the toweling between the supports and operative to pull the toweling loop exteriorly of the housing into a taut condtiion at the end of a dispensing cycle, said weight forming a part of said control mechanism and being responsive to the length of toweling in the toweling look.

9. The combination in a toweling dispenser of the type set forth in claim 6, and further comprising time delay mechanism for stopping said dispensing mechanism and said take-up mechanism after the dispensing of a predetermined length of clean toweling and holding said mechanism in the stopped condition for a predetermined period of time, and loop retraction and sorage mechanism within the housing including a pair of spaced supports having a portion of the toweling suspended thereacross and a weight resting upon the suspended portion of the toweling between the supports and operative to pull the toweling loop exteriorly of the housing into a taut condition after operation of said time delay mechanism.

10. The combination in a toweling dispenser of the type set forth in claim 9, and further comprising mechanism holding said weight in the elevated position during operation of said time delay mechanism.

11. In a toweling dispenser of the continuous type having a housing with a loop of toweling that extends along an exit path from a clear toweling supply within the housing and into an exposed use position exteriorly of the housing accessible to a user and thence along a return path to a soiled toweling storage position within the housing, the combination comprising: dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing for taking up soiled toweling from the toweling loop along the return path and into the soiled toweling storage position within the housing; drive mechanism interconnecting said dispensing mechanism and said take-up mechanism for causing said take-up mechanism to take up soiled toweling at a rate greater than that at which clean toweling is dispensed by said dispensing mechanism; and control mechanism responsive to the length of toweling in the toweling loop for rendering said take-up mechanism temporarily ineffective to take up soiled toweling when the length of toweling in the toweling loop reaches the predetermined length, whereby to maintain substantially constant at the predetermined length the length of toweling in the toweling loop at the exposed use position accessible to a user.

12. In a toweling dispenser of the continuous type having a housing with a loop of toweling that extends along an exit path from a clean toweling supply within the housing and into an exposed use position exteriorly of the housing accessible to a user and thence along a return path to a soiled toweling storage roll within the housing, the combination comprising: dispensing mechanism within the housing for dispensing a lentgh of clean toweling from the clean toweling supply into the toweling loop along the exit path and into use position exteriorly of the housing when the accessible portion of the toweling loop is pulled by a user; take-up mechanism within the housing including a drive member engaging the storage roll for taking up soiled toweling from the toweling loop along the return path and into the soiled toweling storage roll within the housing; drive mechanism interconnecting said dispensing mechanism and said take-up mechanism for causing said take-up mechanism to take up soiled toweling a rate greater than that at which clean toweling is dispensed by said dispensing mechanism; a shield within the housing and movable between a normal position wherein it is disposed away from said drive member and the storage roll to render said take-up mechanism effective to take up soiled toweling an a stop position wherein it is disposed between said drive member and the storage roll to render said take-up mechanism ineffective to take up soiled toweling; and shield actuating mechanism responsive to the length of toweling in the toweling loop for moving said shield between said normal and stop positions to maintain a predetermined length of toweling in the toweling loop, said shield actuating mechanism moving said shield to said stop position at the time that said take-up mechanism has taken up a length of toweling equal to that dispensed when the length of toweling in the toweling loop is substantially equal to the predetermined length, said shield actuating mechanism moving said shield to said stop position relatively early during the dispensing of toweling by said dispensing mechanism when the length of toweling in the toweling loop is less than the predetermined length thereby to take up less toweling than is dispensed and thus to lengthen the toweling loop, said shield actuating mechanism moving said shield to said stop position relatively late during the dispensing of toweling by said dispensing mechanism when the length of toweling in the toweling loop is more than the predetermined length thereby to take up more toweling than is dispensed and thus to shorten the toweling loop, whereby to maintain substantially constant at the predetermined length the length of toweling in the toweling loop at the exposed use position accessible to a user.

13. The combination in a toweling dispenser as set forth in claim 12, wherein said dispensing mechanism including a measuring roll having a frictional drivce surface thereon engaging the clean toweling, said drive member is a drive roll having a frictional surface thereon engaging the soiled toweling, and said drive mechanism includes means positively driving said drive roll from said measuring roll.

14. The combination in a toweling dispenser as set forth in claim 12, wherein said shield has a control arm thereon extending therefrom, said shield actuating mechanism includes a support having a reach of soiled toweling suspended thereacross and a take-up roller resting upon the suspended portion of the soiled toweling, said take-up roller having a normal position well below said control arm and normally pulling the soiled toweling downwardly, said take-up roller being raised to an elevated position when the toweling loop is pulled by a user and being moved into contact with said control arm to move said shield to the stop position thereof.

15. In a toweling dispenser of the continuous type having a housing with a loop of toweling that extends along an exit path from a clean toweling supply within the housing accessible to a user and thence along a return path to a soiled toweling storage position within the housing, the combination comprising: dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing for taking up soiled toweling from the toweling loop along the return path and into the soiled toweling storage position within the housing; clutch mechanism associated with said take-up mechanism and having a drive condition wherein said clutch mechanism is in driving engagement with said take-up mechansm and a release condition wherein said clutch mechanism is out of driving engagement with said take-up mechanism; drive mechanism interconnecting said dispensing mechanism and said clutch mechanism and operable when said clutch mechanism is in the driving condition thereof to cause said take-up mechanism to take up soiled toweling at a rate greater than that at which clean toweling is dispensed by said dispensing mechanism; and control mechanism responsive to the length of toweling in the toweling loop for operating said clutch mechanism from the drive condition to the release condition thereof to maintain a predetermined length of toweling in the toweling loop, said control mechanism operating said clutch mechanism from the drive condition to the release condition thereof at the time that said take-up mechanism has taken up a length of toweling equal to that dispensed when the length of toweling in the toweling loop is substantially equal to the predetermined length, said control mechanism operating said clutch mechanism from the drive condition to the release condition thereof relatively early during the dispensing of toweling by said dispensing mechanism when the length of toweling in the toweling loop is less than the predetermined length thereby to take up less toweling than is dispensed and thus to lengthen the toweling loop, said control mechanism operating said clutch mechanism from the drive condition to the release condition thereof relatively late during the dispensing of toweling by said dispensing mechanism when the length of toweling in the toweling loop is more than the predetermined length thereby to take up more toweling than is dispensed and thus to shorten the toweling loop, whereby to maintain substantially constant at the predetermined length the length of toweling in the toweling loop at the exposed use position accessible to a user.

16. The combination in a toweling dispenser set forth in claim 15, wherein said clutch mechanism is a one-revolution release clutch.

17. The combination in a toweling dispenser as set forth in claim 15, wherein said clutch mechanism includes an actuator for operating said clutch mechanism from the drive condition to the release condition thereof, and said control mechanism includes a support having a reach of soiled toweling suspended thereacross and take-up roller resting upon the suspended portion of the soiled toweling, said take-up roller having a normal position well below said actuator and normally pulling the soiled toweling downwardly, said take-up roller being raised to an elevated position when the toweling loop is pulled by a user and being moved into contact with said actuator to operate said clutch mechanism to the release condition thereof.

18. In a toweling dispenser of the continuous type having a housing with a loop of toweling that extends along an exit path from a clean toweling supply within the housing and into an exposed use position exteriorly of the housing accessible to a user and thence along a return path to a soiled toweling storage position within the housing, the combination comprising: dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing for taking up soiled toweling from the toweling loop along the return path and into the soiled toweling storage position within the housing; drive mechanism interconnecting said dispensing mechansm and said take-up mechanism and responsive to the length of toweling in the toweling loop to maintain a predetermined length of toweling in the toweling loop, said drive mechanism causing said take-up mechanism to take up more toweling than is dispensed by said dispensing mechanism when the length of toweling in the toweling loop is greater than the predetermined length and to take up less toweling than is dispensed by said dispensing mechanism when the length of toweling in the toweling loop is less than the predetermined length, and structure for preventing the withdrawal of soiled toweling from the soiled toweling storage position into the toweling loop; whereby to maintain substantially constant at the predetermined length the length of toweling in the toweling loop at the exposed use position accessible to a user.

19. The combination in a toweling dispenser of the type set forth in claim 18, wherein said dispensing mechanism incudes a measuring roll having a friction surface thereon for dispensing clean toweling when said measuring roll is moved in one direction and stop means for preventing rotation of said measuring roll in the opposite direction, said take-up mechanism includes a take-up drive roll having a friction surface thereon in engagement with the storage roll of soiled toweling in the storage position, and said drive mechanism includes means positively interconnecting said measuring roll and said take-up drive roll so as to prevent movement of said drive roll in a direction to dispense soiled toweling from the storage roll.

20. In a toweling dispenser of the continuous type having a housing with a loop of toweling that extends along an exit path from a clean toweling supply within the housing and into an exposed use position exteriorly of the housing accessible to a user and thence along a return path to a soiled toweling storage postion within the housing, the combination comprising: dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing for taking up soiled toweling from the toweling loop along the return path and into the soiled toweling storage position within the housing; drive mechanism interconnecting said dispensing mechanism and said take-up mechanism for causing said take-up mechanism to take up soiled toweling at a rate greater than that at which clean toweling is dispensed by said dispensing mechanism, control mechanism responsive to the length of toweling in the toweling loop for rendering said take-up mechanism temporarily ineffective to take up soiled toweling to maintain a predetermined length of toweling in the toweling loop, said control mechanism rendering said take-up mechanism ineffective after taking up a length of toweling equal to that dispensed when the length of toweling in the toweling loop is substantially equal to the predetermined length, said control mechanism rendering said take-up mechanism ineffective relatively early during the dispensing of toweling by said dispensing mechanism when the length of toweling in the toweling loop is less than the predetermined length thereby to take up less toweling than is dispensed and thus to lengthen the toweling loop, said control mechanism rendering said take-up mechanism ineffective relatively late during the dispensing of toweling by said dispensing mechanism when the length of toweling in the toweling loop is greater than the predetermined length thereby to take up more toweling than is dispensed and thus to shorten the toweling loop, and structure for preventing the withdrawal of soiled toweling from the soiled toweling storage position into the toweling loop while said control mechanism is rendering said take-up mechanism temporarily ineffective; whereby to maintain substantially constant at the predetermined length the length of toweling in the toweling loop at the exposed use position accessible to a user.

21. The combination in a toweling dispenser of the type set forth in claim 20, wherein said dispensing mechanism includes a measuring roll having a friction surface thereon for dispensing clean toweling when said measuring roll is moved in one direction and stop means for preventing rotation of said measuring roll in the opposite direction, said take-up mechanism includes a take-up drive roll having a friction surface thereon in engagement with a storage roll of soiled toweling in the storage position, and said drive mechanism includes means positively interconnecting said measuring roll and said take-up drive roll so as to prevent movement of said drive roll in a direction to dispense soiled toweling from the storage roll.

22. In a toweling dispenser of the continuous type having a housing with a loop of toweling that extends along an exit path from a clean toweling supply within the housing and into an exposed use position exteriorly of the housing accessible to a user and thence along a return path to a soiled toweling storage roll within the housing, the combination comprising: dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing including a drive member engaging the storage roll for taking up soiled toweling from the toweling loop along the return path and into the soiled toweling storage roll within the housing; drive mechanism interconnecting said dispensing mechanism and said take-up mechanism for causing said take-up mechanism to take up soiled toweling at a rate greater than that at which clean toweling is dispensed by said dispensing mechanism; a shield within the housing and movable between a normal position wherein it is disposed away from said drive member and the storage roll to render said take-up mechanism effective to take up soiled toweling and a stop position wherein it is disposed between said drive member and the storage roll to render said take-up mechanism ineffective to take up soiled toweling; shielding actuating mechanism responsive to the length in the toweling loop for moving said shield between said normal and stop positions to maintain a predetermined length of toweling in the toweling loop, said shield actuating mechanism moving said shield to said stop position at the time that said take-up mechanism has taken up a length of toweling equal to that dispensed when the length of toweling in the toweling loop is substantially equal to the predetermined length, said shield actuating mechanism moving said shield to said stop position relatively early during the dispensing of toweling by said dispensing mechanism when the length of toweling in the toweling loop is less than the predetermined length thereby to take up less toweling than is dispensed and thus to lengthen the toweling loop, said shield actuating mechanism moving said shield to said stop position relatively late during the dispensing of toweling by said dispensing mechanism when the length of toweling in the toweling loop is more than the predetermined length thereby to take up more toweling than is dispensed and thus to shorten the toweling loop, and structure for moving said shield from the stop position thereof to the normal position thereof in response to attempted withdrawal of soiled toweling from the soiled toweling storage roll into the toweling loop when said shield is in the stop position thereof at the end of a dispensing operation; whereby to maintain substantially constant at the predetermined length the length of toweling in the toweling loop at the exposed use position accessible to a user.

23. In combination in a toweling dispenser as set forth in claim 22, wherein said drive mechanism includes means positively preventing movement of said drive member in a direction permitting withdrawal of soiled toweling from the storage roll when said shield is in the normal position thereof.

24. The combination in a toweling dispenser as set forth in claim 22, wherein said shield has a control arm thereon extending therefrom, said shield actuating mechanism includes a support having a reach of soiled toweling suspended thereacross and a take-up roller resting upon the suspended portion of the soiled toweling, said take-up roller having a normal position well below said control arm and normally pulling the soiled toweling downwardly, said take-up roller being raised to an elevated position when the toweling loop is pulled by a user and being moved into contact with said control arm to move said shield to the stop position thereof if said take-up mechanism is taking up soiled toweling in the normal manner, and said take-up roller passing out of contact with said control arm to move said shield to the normal position thereof if said take-up mechanism is not taking up soiled toweling at the time of contact between said take-up roller and said control arm.

25. The combination in a toweling dispenser as set forth in claim 24, wherein said control arm carries a resilient member thereon, the portion of said take-up roller in position to contact said control arm being formed of a material that will frictionally engage the resilient member on said control arm, whereby said take-up roller walks under the control arm to actuate said shield to the storage position thereof if the take-up mechanism is taking up soiled toweling and said take-up roller walks out from under said control arm to move said shield to the normal position thereof if said take-up mechanism is not taking up soiled toweling.

26. In a toweling dispenser of the continuous type having a housing with a loop of toweling that extends along an exit path from a clean toweling supply within the housing and into an exposed use position exteriorly of the housing accessible to a user and thence along a return path to a soiled toweling storage roll within the housing, the combination comprising: dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing including a drive member engaging the storage roll for taking up soiled toweling from the toweling loop along the return path and into the soiled toweling storage roll within the housing; drive mechanism interconnecting said dispensing mechanism and said take-up mechanism for causing said take-up mechanism to take up soiled toweling at a rate greater than that at which clean toweling is dispensed by said dispensing mechanism; a shield within the housing and movable between a normal position wherein it is disposed away from said drive member and the storage roll to render said take-up mechanism effective to take up soiled toweling and a stop position wherein it is disposed between said drive member and the storage roll to render said take-up mechanism ineffective to take up soiled toweling; shield actuating mechanism responsive to the length of toweling in the toweling loop for moving said shield between said normal and stop positions to maintain a predetermined length of toweling in the toweling loop, said shield actuating mechanism moving said shield to said stop position at the time that said take-up mechanism has taken up a length of toweling equal to that dispensed when the length of toweling in the toweling loop is substantially equal to the predetermined length, said shield actuating mechanism moving said shield to said stop position relatively early during the dispensing of toweling by said dispensing mechanism when the length of toweling in the toweling loop is less than the predetermined length thereby to take up less toweling than is dispensed and thus to lengthen the toweling loop, said shield actuating mechanism moving said shield to said stop position relatively late during the dispensing of toweling by said dispensing mechanism when the length of toweling in the toweling loop is more than the predetermined length thereby to take up more toweling than is dispensed and thus to shorten the toweling loop, and a device for preventing operation of said dispensing mechanism while said shield is in the stop position thereof thereby to prevent dispensing of clean toweling while the toweling loop is being pulled by the user in a direction tending to withdraw soiled toweling from the soiled toweling storage roll into the toweling loop; whereby to maintain substantially constant at the predetermined length the length of toweling in the toweling loop at the exposed use position accessible to a user.

27. The combination in a toweling dispenser as set forth in claim 22, wherein said device for preventing operation of said dispensing mechanism is a positive stop forming a part of said drive mechanism and operable in response to the movement of said shield to the stop position thereof.

28. The combination in a toweling dispenser as set forth in claim 26, wherein said dispensing mechanism includes a measuring roll having a friction surface thereon for dispensing clean toweling thereacross and a sprocket driven thereby, said take-up mechanism includes a take-up drive roll having a friction surface thereon for contact with the soiled toweling in the storage roll and having a drive sprocket therefore carrying a stop pin thereon, said drive mechanism includes a drive chain interconnecting said sprockets, said device includes a stop lever and a stop arm controlled thereby and movable into and out of stop position with respect to said stop pin, and a control surface on said shield engaging said stop lever and moving said stop lever and said stop arm to the stop positions thereof when said shield actuating mechanism moves said shield to the stop position thereof.

29. In a toweling dispenser of the continuous type having a housing with a loop of toweling that extends along an exit path from a clean toweling supply within the housing and into an exposed use position exteriorly of the housing accessible to a user and thence along a return path to a soiled toweling storage roll within the housing, the combination comprising: dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing including a drive member engaging the storage roll for taking up soiled toweling from the toweling loop along the return path and into the soiled toweling storage roll within the housing; drive mechanism interconnecting said dispensing mechanism and said take-up mechanism for causing said take-up mechanism to take up soiled toweling at rate greater than that at which clean toweling is dispensed by said dispensing mechanism; a shield within the housing and movable between a normal position wherein it is disposed away from said drive member and the storage roll to render said take-up mechanism effective to take up soiled toweling and a stop position wherein it is disposed between said drive member and the storage roll to render said take-up mechanism ineffective to take up soiled toweling; shield actuating mechanism responsive to the length of toweling in the toweling loop for moving said shield between said normal and stop positions to maintain a predetermined length of toweling in the toweling loop, said shield actuating mechanism moving said shield to said stop position at the time that said take-up mechanism has taken up a length of toweling equal to that dispensed when the length of toweling in the toweling loop is substantially equal to the predetermined length, said shield actuating mechanism moving said shield to said stop position relatively early during the dispensing of toweling by said dispensing mechanism when the length of toweling in the toweling loop is less than the predetermined length thereby to take up less toweling than is dispensed and thus to lengthen the toweling loop, said shield actuating mechanism moving said shield to said stop position relatively late during the dispensing of toweling by said dispensing mechanism when the length of toweling in the toweling loop is more than the predetermined length thereby to take up more toweling than is dispensed and thus to shorten the toweling loop, structure for moving said shield from the stop position thereof to the normal position thereof in response to attempted withdrawal of soiled toweling from the soiled toweling storage roll into the toweling loop when said shield is in the stop position thereof at the end of a dispensing operation; a device for preventing operation of said dispensing mechanism while said shield is in the stop position thereof thereby to prevent dispensing of clean toweling while the toweling loop is being pulled by the user in a direction tending to withdraw soiled toweling from the soiled toweling storage roll into the toweling loop; whereby to maintain substantially constant at the predetermined length the length of toweling in the toweling loop at the exposed use position accessible to a user.

30. In a toweling dispenser of the continuous type having a housing with a loop of toweling that extends along an exit path from a clean toweling supply within the housing and into an exposed use position exteriorly of the housing accessible to a user and thence along a return path to a soiled toweling storage position within the housing, the combination comprising dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing for taking up soiled toweling from the toweling loop along the return path and into the soiled toweling storage position within the housing; drive mechanism interconnecting said dispensing mechanism and said take-up mechanism and responsive to the length of toweling in the toweling loop to maintain a predetermined length of toweling in the toweling loop, loop retraction and storage mechanism within said housing including a support having a reach of soiled toweling suspended thereacross and a take-up roller resting upon the suspended portion of the soiled toweling, a pair of arms shiftably mounted on the housing and supporting said take-up roller therebetween and guiding said take-up roller along a generally vertical path within the housing during operation of said dispenser, and support means on said arms and engagable with said support for holding said arms and the attached take-up roller in an elevated position during the loading of clean toweling into said dispenser.

31. In a toweling dispenser of the continuous type having a housing with a loop of toweling that extends along an exit path from a clean toweling supply within the housing and into an exposed use position exteriorly of the housing accessible to a user and thence along a return path to a soiled toweling storage position with the housing, the combination comprising dispensing mechanism within the housing for dispensing a length of clean toweling from the clean toweling supply into the toweling loop along the exit path and into use position exteriorly of the housing when the accessible portion of the toweling loop is pulled by a user; take-up mechanism within the housing for taking up soiled toweling from the toweling loop along the return path and into the soiled toweling storage position within the housing; drive mechanism interconnecting said dispensing mechanism and said take-up mechanism and responsive to the length of toweling in the toweling loop to maintain a predetermined length of toweling in the toweling loop, loop retraction and storage mechanism within said housing including a brake roller shiftably and rotatably mounted on the housing and a support adjacent thereto, said brake roller and said support having a reach of soiled toweling suspended thereacross, a pair of spaced apart arms mounted on the housing and carrying a take-up roller resting upon the suspended portion of the soiled toweling, said take-up roller having a normal position well below said brake roller and normally pulling the soiled toweling downwardly, a brake mechanism normally engaging said brake roller and positively preventing rotation thereof in a take-up roller lowering direction thereby to hold said take-up roller in the position to which it is lifted when the user pulls soiled toweling from said dispenser, and time-stop mechanism operable after a predetermined period of time subsequent to the withdrawal of clean toweling by the said dispensing mechanism and subsequent to the withdrawal of soiled toweling to lift said take-up roller to release said brake mechanism and to permit said take-up roller to fall to the normal position thereof.

32. The combination in a towel dispenser as set forth in claim 31, wherein the housing has a cover thereon shiftable between a closed position and an open position for accommodating the placement of clean toweling therein, said brake roller being mounted for shiftable movement away from the rear of the housing to facilitate passage of clean toweling thereover, and a lifting arm mounted on said cover and movable upon shifting of the cover to its open position into contact with said brake roller to shift said brake roller away from the rear wall of the housing.

33. The combination in a towel dispenser as set forth in claim 32, wherein said arms have notches therein engaging over said support to hold said arms and the take-up roller in an elevated position during the loading of clean toweling into said dispenser, and a loading guide mounted on said arms and positioned between said brake roller and said support in the elevated position of said arms to prevent inadvertent passage of clean toweling therebetween.

34. The combination in a toweling dispenser set forth in claim 33, and further comprising a cable interconnecting the cover and said arms for lifting said arms to said elevated position when said cover is moved to the open position thereof.

References Cited

UNITED STATES PATENTS

| | | | |
|---|---|---|---|
| 2,899,251 | 8/1959 | Birr | 312—38 |
| 3,198,591 | 8/1965 | Kirkell | 312—38 |
| 3,215,481 | 11/1965 | Kobi | 312—38 |
| 3,265,454 | 8/1966 | Scanland | 312—38 |
| 3,323,848 | 6/1967 | Bahnsen | 312—38 |

CASMIR A. NUNBERG, Primary Examiner